United States Patent
Hamaoka et al.

[19]

[11] Patent Number: 6,157,554
[45] Date of Patent: Dec. 5, 2000

[54] POWER UNIT

[75] Inventors: Koji Hamaoka, Osaka; Katsumi Endo, Takarazuka; Kazunori Kurimoto, Osaka, all of Japan

[73] Assignee: Matsushita Refrigeration Company, Osaka, Japan

[21] Appl. No.: 09/319,542

[22] PCT Filed: Dec. 8, 1997

[86] PCT No.: PCT/JP97/04500
§ 371 Date: Jun. 9, 1999
§ 102(e) Date: Jun. 9, 1999

[87] PCT Pub. No.: WO98/26497
PCT Pub. Date: Jun. 18, 1998

[30] Foreign Application Priority Data

Dec. 10, 1996 [JP] Japan ................................. 8-329329
Mar. 27, 1997 [JP] Japan ................................. 9-075390

[51] Int. Cl.$^7$ ............................. H02M 1/12; H02M 1/14
[52] U.S. Cl. ................................... 363/46; 363/53; 363/80
[58] Field of Search ............................. 363/45, 46, 47, 363/52, 53, 48, 125, 126, 81, 82

[56] References Cited

U.S. PATENT DOCUMENTS

| | | | |
|---|---|---|---|
| 3,660,787 | 5/1972 | Mahmoud et al. | 333/181 |
| 5,399,955 | 3/1995 | Glaser et al. | 323/208 |
| 5,535,087 | 7/1996 | Puckett et al. | 361/118 |
| 5,642,267 | 6/1997 | Brkovic et al. | 363/16 |
| 5,687,070 | 11/1997 | Jacobs et al. | 363/126 |
| 5,777,866 | 7/1998 | Jacobs et al. | 363/126 |
| 5,883,502 | 3/1999 | Spitaler | 323/222 |

FOREIGN PATENT DOCUMENTS

| | | | |
|---|---|---|---|
| 58-69462 | 4/1983 | Japan | H02M 3/28 |
| 65-209574 | 7/1994 | Japan | H02M 7/06 |
| 7-36700 | 4/1995 | Japan | H02M 7/06 |
| 8-149812 | 6/1996 | Japan | H02M 7/06 |

OTHER PUBLICATIONS

Patent Abstracts of Japan, vol. 11, No. 367 (E–561), Nov. 28, 1987 & JP 62 138058 A (Matsushita Seiko), Jun. 20, 1987.
Patent Abstracts of Japan, vol. 11, No. 355 (E–558), Nov. 19, 1987 & JP 62 131757 A (Hitachi Metals), Jun. 15, 1987.

*Primary Examiner*—Peter S. Wong
*Assistant Examiner*—Bao Q. Vu
*Attorney, Agent, or Firm*—Wenderoth, Lind & Ponack, L.L.P.

[57] ABSTRACT

The present invention relates to an electric power unit with a condenser input type rectification circuit which converts an alternating current power source to a direct current voltage, and more particularly, to an electric power unit for inverter-controlled refrigerators.

An electric power unit according to the present invention feeds electric power to a load (7), which comprises an alternating current power source (1), a bridge-type rectification circuit (2) having an input from the alternating current power source (1) and consisting of bridge-connected diodes (D1, D2, D3, D4), an auxiliary capacitor (3) connected in parallel to an output of the bridge-type rectification circuit (2), a series circuit of a reactor (4) and a diode (5) connected between one output of the bridge-type rectification circuit (2) and the load (7) so as to flow a load current in a forward direction, and a smoothing capacitor (6) connected in parallel to the load (7). Moreover, the reactor (4) is constituted of a first reactor (42) and a second reactor (43), a capacity of which is made variable through controlling of a parallel connection of the second reactor (43) to the first reactor (42) by a switching means (44) in accordance with a change of a current running in the first reactor (42) or a change of an environment where the first reactor (42) is used.

18 Claims, 19 Drawing Sheets

POWER UNIT

FIELD OF THE INVENTION

The present invention relates to an electric power unit with a condenser input type rectification circuit which converts an alternating current power source to a direct current voltage, and more particularly, to an electric power unit for inverter-controlled refrigerators, etc.

PRIOR ART

While a condenser input type rectification circuit has been widely used to convert an alternating current to a direct current in inverters of refrigerating systems such as refrigerators, air conditioners and the like, or in switching power sources, etc., a current waveform of the condenser input type rectification circuit is not a sine wave, but includes many higher harmonics, particularly higher harmonic components of odd orders of a fundamental frequency, thus causing various troubles. For lessening the current of higher harmonics, therefore, more and more development has been proceeded, one of which is realized as a passive filter. The passive filter is adapted generally to soften the current waveform with the use of a reactor thereby to suppress higher harmonics. However, the reactor of the passive filter should be of a considerably large capacity in order to completely suppress the higher harmonics only thereby. In the meantime, another type of proposals has been made to control the higher harmonics, in which an auxiliary means is employed. For instance, Unexamined Japanese Patent Laid-Open Publication No. H7-274515 describes an effective method for the purpose.

BACKGROUND TECHNOLOGY OF THE INVENTION AND ITS PROBLEM

In order to understand features of the present invention, an electric power unit adopting a conventional higher harmonics control method will be described with reference to FIGS. 19 and 20. FIG. 19 is a circuit diagram of an example of a conventionally used electric power unit. An electric power unit 100 in FIG. 19 is constituted of an alternating current power source 101 which is, for example, a commercial power source of 100V 50 Hz to general household, a bridge-type rectifier 102 for rectifying the alternating current power source 101, a first reactor 103, a diode 104, a second reactor 105, a capacitor 106 and a smoothing capacitor 107. The bridge-type rectifier 102 consists of four diodes D101, D102, D103, D104 in bridge connection.

The first reactor 103 has its one end connected to a + output of the bridge-type rectifier 102 and the other end connected to an anode of the diode 104. The second reactor 105 has its one end connected to the + output of the bridge-type rectifier 102 and the other end connected to one end of the capacitor 106. A cathode of the diode 104 is connected with the other end of the capacitor 106, and connected also to one end of the smoothing capacitor 107. The other end of the smoothing capacitor 107 is connected to a − output of the bridge-type rectifier 102. A load 108 of the power unit 100 is connected to both ends of the smoothing capacitor 107.

Now, the operation of the electric power unit 100 will be described. FIG. 20 is a diagram of waveforms of a half cycle in the electric power unit 100 shown in FIG. 19. An input voltage Vin from the alternating current power source 101 is a sine wave as indicated in FIG. 20. A current I101 running in the first reactor 103 shows a bent waveform because a charging current to the smoothing capacitor 107 is smoothed at the first reactor 103. A current I102 running in the second reactor 105 shows a waveform oscillating with a resonant frequency of the second reactor 105 and capacitor 106. An input current Iin becomes a sum of I101 and I102, assuming a waveform as shown in FIG. 20. Since the waveform of the input power is softened and a peak value of the current is lowered as above, higher harmonics are suppressed further.

The aforementioned arrangement has drawbacks, though. As described hereinabove, in the prior art, such current is supplied that supplements higher harmonics with the utilization of the resonance of the second reactor 105 and capacitor 106 and consequently, the resonant frequency is required to be set at three times a frequency of the power source. For example, when the power source has a frequency of 50 Hz, the resonant frequency should be set to approximately 150 Hz. The second reactor 105 should be approximately 10 mH supposing that the capacitor 106 has a capacity of 100 $\mu$F. In the conventional arrangement, both the second reactor 105 and the capacitor 106 should have large capacities in order to suppress the higher harmonics. The first reactor 103 alike should have a large current capacity to cope with a large current in case of a large load. From these reasons, the conventional electric power unit is disadvantageously bulky in size and is expensive.

SUMMARY OF THE INVENTION

The present invention is devised to solve the above-discussed problems and has for its object to provide an electric power unit which, with using smaller parts, sufficiently effectively suppresses higher harmonics in reduced size and cost.

In order to achieve the aforementioned objective, according to the present invention, an electric power unit for feeding electric power to a load comprises an alternating current power source, a bridge-type rectification circuit having an input from the alternating current power source and formed of diodes in bridge connection, an auxiliary capacitor connected in parallel to an output of the bridge-type rectification circuit, a series circuit consisting of a reactor and a diode which is connected between one output of the bridge-type rectification circuit and the load so as to feed a load current in a forward direction, and a smoothing capacitor connected in parallel to the load. Because of the auxiliary capacitor of a small capacity set at the output of the bridge-type rectification circuit, and since a charging current is sent to the auxiliary capacitor before the smoothing capacitor is charged, the charging current to the auxiliary capacitor is utilized as a supplementary current.

An electric power unit according to the present invention for feeding electric power to a load consists of an alternating current power source, a bridge-type rectification circuit of diodes in bridge connection with having an input from the alternating current power source, an auxiliary reactor having one end connected to one output of the bridge-type rectification circuit, an auxiliary capacitor connected between the other end of the auxiliary reactor and the other output of the bridge-type rectification circuit, a series circuit of a reactor and a diode connected between the other end of the auxiliary reactor and the load so as to feed a load current in a forward direction, and a smoothing capacitor connected in parallel to the load. The auxiliary reactor of a small capacity connected between the bridge-type rectification circuit and the auxiliary capacitor controls a charging current to the auxiliary capacitor not to rise sharply.

An electric power unit of the present invention feeds electric power to a load, which comprises an alternating current power source, a bridge-type rectification circuit formed of diodes in bridge connection with having an input from the alternating current power source, a reactor with a middle tap which has one end connected to one output of the bridge-type rectification circuit, an auxiliary capacitor connected between the middle tap of the reactor and the other output of the bridge-type rectification circuit, a diode connected between the other end of the reactor and the load so as to feed a load current in a forward direction, and a smoothing capacitor connected in parallel to the load. Because of the reactor constituted of a reactor with a middle tap, a count of parts of the electric power unit is reduced while the suppression effect to higher harmonics is maintained.

An electric power unit according to the present invention feeds electric power to a load, which comprises an alternating current power source, a bridge-type rectification circuit formed of diodes in bridge connection with having an input from the alternating current power source, a first diode connecting one output of the bridge rectification circuit with the load in a forward direction, a reactor having one end connected to the one output of the bridge-type rectification circuit, a second diode connecting the other end of the reactor with the load in the forward direction, and a smoothing capacitor connected to the other output of the reactor and the other output of the bridge-type rectification circuit. An output of the bridge-type rectification circuit is used in two ways, specifically, to charge the smoothing capacitor and to directly feed electricity to the load. The electricity is supplied directly from the first diode, not through the smoothing capacitor when an input source voltage is a peak value.

An electric power unit according to the present invention feeds electric power to a load, which comprises an alternating current power source, a bridge-type rectification circuit formed of diodes in bridge connection with having an input from the alternating current power source, a reactor connecting one output of the bridge-type rectification circuit with the load, a series circuit of a voltage drop means and a first diode which is connected so as to feed a load current in a forward direction, with its one end connected to the reactor at the side of the load, a second diode connecting an output of the series circuit with the load in the forward direction, and a smoothing capacitor connected to the output of the series circuit and the other output of the bridge-type rectification circuit. An output from the bridge-type rectification circuit is used in two ways, namely, to charge the smoothing capacitor, to directly feed electric power to the load and to lower a charging voltage to the smoothing capacitor at the voltage drop means. An output of the reactor is directly supplied to the load when a source voltage is in the vicinity of a peak value, without being passed through the smoothing capacitor, so that higher harmonics in charging the smoothing capacitor are restricted.

More specifically, the above reactor is a capacity variable reactor and includes a capacity control means for variably controlling a capacity of the reactor. The capacity of the reactor is changed in accordance with a change of a current running in the reactor or a change of an environment where the reactor is used.

Further, the above reactor is comprised of a first reactor flowing a load current and a second reactor connected in parallel to the first reactor for bypassing the load current. The capacity control means is constituted of a switching means for controlling the parallel connection of the second reactor to the first reactor and a switching control means for controlling switching of the switching means. The parallel connection of the second reactor to the first reactor is controlled as above, so that the first reactor is maintained at lower than a predetermined temperature.

The above-described switching control means is provided with an air temperature detecting means for detecting an outside air temperature, thereby controlling the switching means to connect the second reactor in parallel to the first reactor if the temperature detected by the air temperature detecting means is not lower than a predetermined value. The second reactor is connected in parallel to the first reactor when the outside temperature becomes not lower than the predetermined value, and accordingly a current capacity of the reactor is increased. When the outside air is lower than the predetermined temperature, the connection of the second reactor to the first reactor is shut, thereby decreasing the current capacity of the reactor.

In a different feature of the electric power unit, the above switching control means is provided with a current detecting means for detecting a load current, and controls the switching means to connect the second reactor in parallel to the first reactor when the load current detected by the detecting means is not smaller than a predetermined value. The second reactor is connected in parallel to the first reactor when the load current is not smaller than the predetermined value, and eventually a current capacity of the reactor is increased. If the load current is smaller than the predetermined value, the second reactor is disconnected from the first reactor, and the current capacity of the reactor is reduced.

In a yet another feature of the electric power unit, the switching control means is provided with a reactor temperature detecting means for detecting a temperature of the first reactor. When the temperature of the first reactor detected by the detecting means is not lower than a predetermined value, the switching control means controls the switching means to connect the second reactor in parallel to the first reactor. That is, when the first reactor becomes not lower than the predetermined temperature, a current capacity of the reactor is increased by connecting the second reactor in parallel to the first reactor. When the first reactor is lower than the predetermined temperature, the second reactor is separated from the first reactor, thereby decreasing the current capacity of the reactor.

For instance, the load referred to above is an inverter and a motor a revolution number of which is controlled by the inverter. The switching control means controls the revolution number of the motor through controlling of the inverter, and controls to switch the switching means to connect the second reactor in parallel to the first reactor when the revolution number of the motor reaches a predetermined value or larger. In this manner, a current capacity of the reactor is increased by connecting the second reactor in parallel to the first reactor when the revolution number of the motor becomes not smaller than the predetermined value, or the current capacity of the reactor is decreased by disconnecting the second reactor from the first reactor in the event that the revolution number of the motor becomes smaller than the predetermined value.

The above motor is, e.g., a compressor of an electric refrigerator. The switching control means includes a temperature detecting means for detecting a temperature inside the electric refrigerator and a temperature setting means for setting a temperature inside the electric refrigerator. The control means controls the revolution number of the compressor via the inverter in accordance with a difference of the temperatures detected by the detecting means and set by the setting means, and switches ON the switching means to connect the second reactor in parallel to the first reactor when the revolution number of the compressor becomes not smaller than a predetermined value. As above, when the revolution number of the compressor in the electric refrigerator is not smaller than the predetermined value, a current capacity of the reactor is increased by connecting the second reactor in parallel to the first reactor. If the revolution number of the compressor becomes smaller than the predetermined value, the connection of the second reactor to the first reactor is shut and the current capacity of the reactor is reduced.

BEST MODE FOR EXECUTING THE INVENTION

Preferred embodiments of the present invention will be described hereinbelow with reference to the drawings.

Embodiment 1

Figure 1:
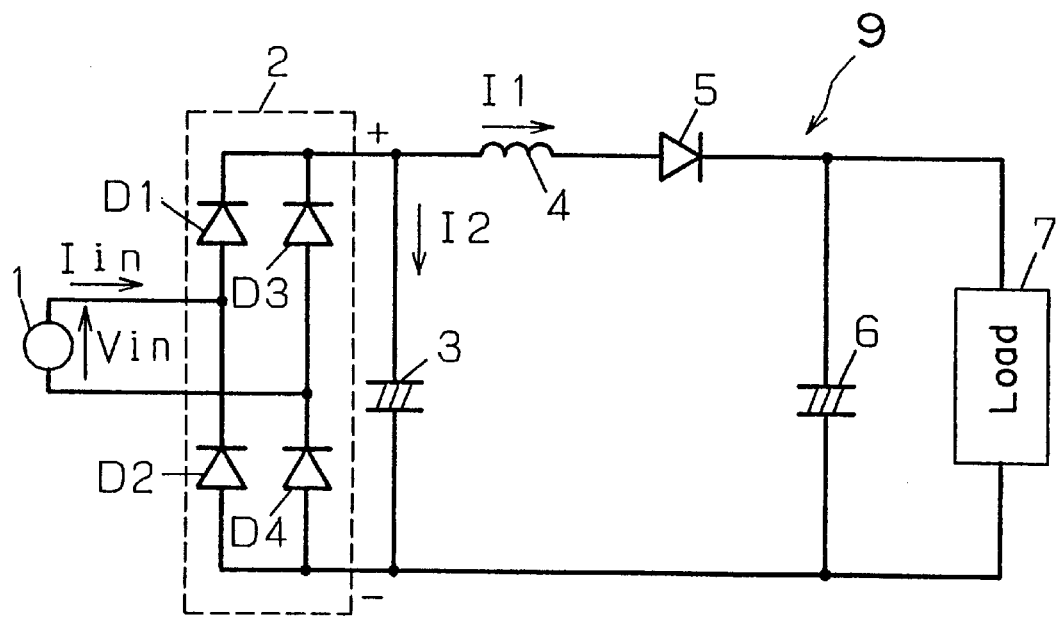
FIG. 1 is a circuit diagram of an electric power unit constituted according to an embodiment of the present invention.

FIG. 1 is a circuit diagram of an electric power unit according to an Embodiment 1 of the present invention. In FIG. 1, an electric power unit 9 is constituted of an alternating current power source 1, e.g., a 100V 50 Hz commercial power source for general household, a bridge-type rectification circuit 2 for rectifying the alternating current power source 1, an auxiliary capacitor 3, a reactor 4 (which can be a capacity-variable reactor), a diode 5 and a smoothing capacitor 6. The bridge-type rectification circuit 2 is formed of four diodes D1, D2, D3, D4 in bridge connection. The auxiliary capacitor 3 has its one end and the other end connected respectively to a + output and a − output of the bridge-type rectification circuit 2. The reactor 4 has its one end and the other end connected to the + output of the bridge-type rectification circuit 2 and an anode of the diode 5, respectively. The smoothing capacitor 6 has its one end and the other end connected to a cathode of the diode 5 and the − output of the bridge-type rectification circuit 2, respectively. A load 7 is connected to both ends of the smoothing capacitor 6.

Figure 2:
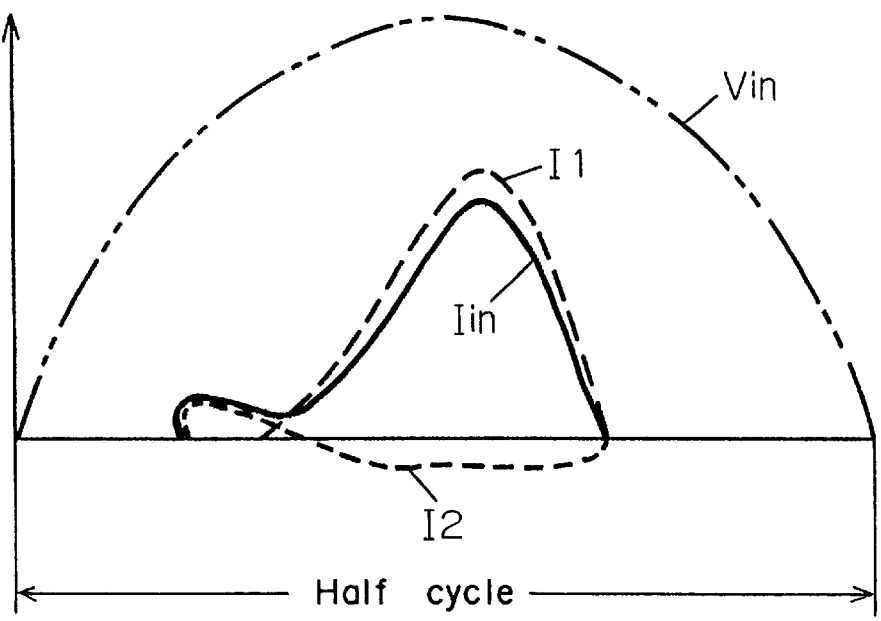
FIG. 2 is a diagram of waveforms of half a cycle at parts of the electric power unit of FIG. 1.

The operation of the electric power unit 9 constituted as above will be depicted with reference to FIGS. 1 and 2. FIG. 2 is a diagram of waveforms at parts of the electric power unit 9 of FIG. 1 in a half cycle. An input voltage Vin from the alternating current power source 1 is, as is clear from FIG. 2, a sine wave. A current I1 flowing in the reactor 4 shows a waveform such that a charging current to the smoothing capacitor 6 is rounded at the reactor 4. A current I2 flowing in the auxiliary capacitor 3 starts charging when the input voltage Vin becomes higher than a voltage between both ends of the auxiliary capacitor 3. Charged charges are drawn to the auxiliary capacitor 3 when the smoothing capacitor 6 is charged by the reactor 4. That is, the voltage between both ends of the auxiliary capacitor 3 is sufficiently low when the current I1 finishes to flow, and consequently, the current starts to flow at a next cycle sufficiently earlier than at the normal time of charging. An input current Iin is accordingly a sum of I1 and I2, showing a waveform as illustrated in FIG. 2.

As depicted above, the input current Iin has a larger waveform width than in a general arrangement of the power unit and a peak value of the current is decreased, so that higher harmonics are repressed. In terms of orders of higher harmonics, third and fifth components are reduced more as compared with in a general waveform, whereas the current rises steeply and components of ninth and larger orders are increased slightly. However, Embodiment 1 is effective to suppress the higher harmonic current because the most influential third and fifth components are noticeably reduced. The higher harmonic component of each order can be adjusted finely by means of a capacity value of the auxiliary capacitor 3. For instance, the third and fifth components are decreased more, while ninth and following components are increased further if the capacity of the auxiliary capacity 3 is increased. Higher harmonics can thus be controlled in an optimum manner through the adjustment of the capacity of the auxiliary capacitor 3.

In the meantime, the capacity of the auxiliary capacitor 3 can be so small as approximately $\frac{1}{100}$ (approximately several $\mu$F) a capacity of the smoothing capacitor 6 (generally, about several hundreds $\mu$F to several thousands $\mu$F). Higher harmonics were actually effectively restricted in experiments with mere 1 $\mu$F capacity of the auxiliary capacitor 3 to 390 $\mu$F capacity of the smoothing capacitor 6, without any trouble given rise to in higher order components.

The reactor 4 and the diode 5 in Embodiment 1 may be replaced with each other, and in that case, the anode of the diode 5 is connected to the + output of the bridge-type rectification circuit 2 and the reactor 4 is connected between the cathode of the diode 5 and one end of the load 7.

As described hereinabove, the electric power unit of Embodiment 1 is provided with the auxiliary capacitor 3 of a small capacity at the output of the bridge-type rectification circuit 2, so that the charging current running in the auxiliary capacitor 3 is used as a supplementary current. In contrast to a general electric power unit based on the higher harmonics control method with the use of a passive filter (a reactor alone), the electric power unit of the Embodiment can limit higher harmonics effectively simply by the addition of the compact and inexpensive parts, i.e., auxiliary capacitor 3 and diode 5. Moreover, the compact and inexpensive parts make the electric power unit small and low-cost.

Embodiment 2

Figure 3:
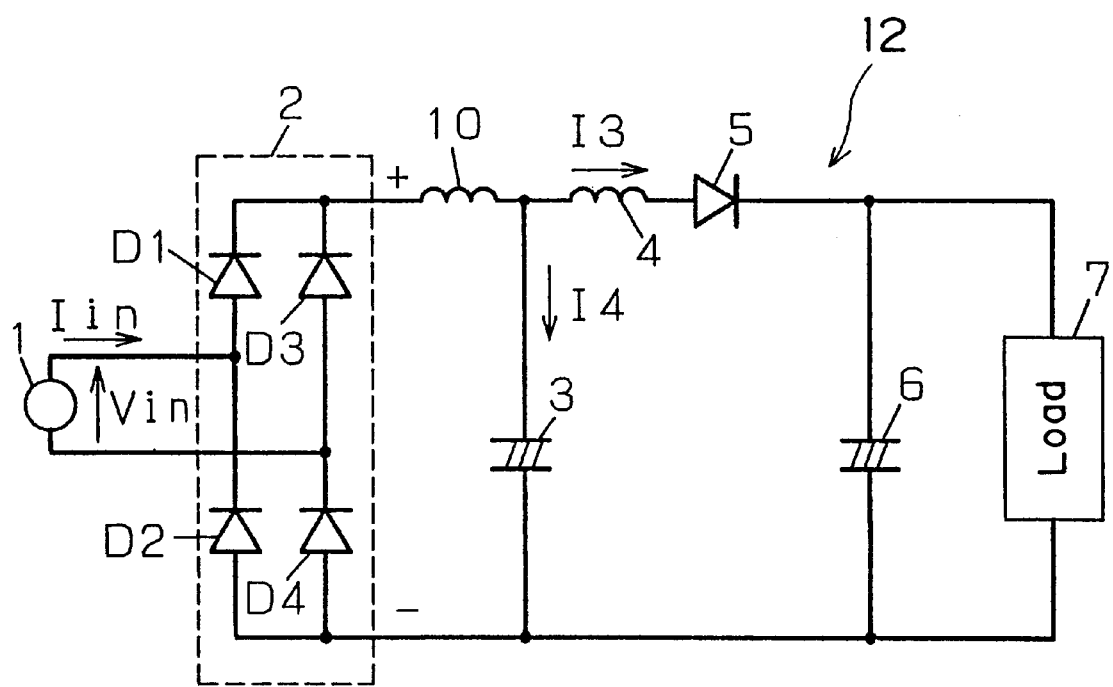
FIG. 3 is a circuit diagram of an electric power unit constituted according to an embodiment of the present invention.

FIG. 3 is a circuit diagram of an electric power unit according to an Embodiment 2 of the present invention. Parts of the same constitution as in FIG. 1 are designated by the same reference numerals in FIG. 3, the description of which is omitted here. Only a difference from FIG. 1 will be discussed now. Specifically, what is different from FIG. 1 is that an auxiliary reactor 10 is inserted at a connecting part between the auxiliary capacitor 3 and the reactor 4, whereby the electric power unit 9 of FIG. 1 becomes an electric power unit 12 in FIG. 3.

Referring to FIG. 3, the electric power unit 12 is constituted of the alternating current power source 1, bridge-type rectification circuit 2, auxiliary capacitor 3, reactor 4, diode 5, smoothing capacitor 6 and auxiliary reactor 10. The auxiliary reactor 10 is connected between the + output of the bridge-type rectification circuit 2 and the connection part between the auxiliary capacitor 3 and reactor 4.

Figure 4:
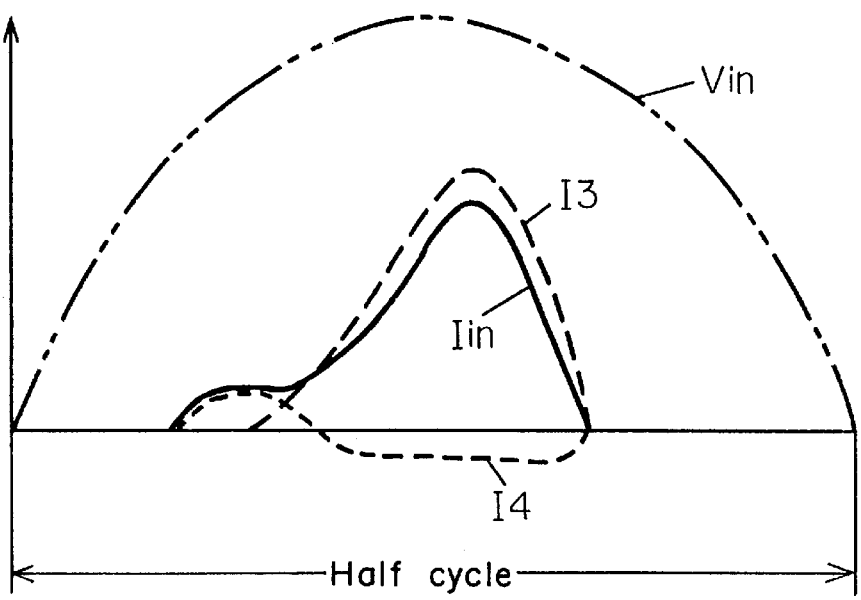
FIG. 4 is a diagram of waveforms of half a cycle at parts of the electric power unit of FIG. 3.

The operation of the thus-constituted electric power unit 12 will be described with reference to FIGS. 3 and 4. FIG. 4 is a diagram of waveforms in half a cycle of the electric power unit 12 shown in FIG. 3. The input voltage Vin from the alternating current power source 1 is a sine wave, as is apparent in FIG. 4. A charging current to the smoothing capacitor 6 is dulled at the reactor 4 as recognized from a waveform of a current I3 flowing in the reactor 4. A current I4 running in the auxiliary capacitor 3 starts charging when the input voltage Vin becomes higher than a voltage at both ends of the auxiliary capacitor 3, which is dulled by the auxiliary reactor 10 when rising. Since the electric power unit 12 operates fundamentally in the same manner as in Embodiment 1 except the above point, the detailed description is omitted here.

The input current Iin becomes a sum of I3 and I4 and shows a waveform indicated in FIG. 4. Particularly, the waveform of the current I4 running in the auxiliary capacitor 3 at the rise time is dulled by the auxiliary reactor 10, so that the ninth and following higher harmonic components increasing in the power unit of Embodiment 1 are reduced. A capacity of the auxiliary reactor 10 is enough to be approximately 1/10 a capacity of the reactor 4. For example, when the reactor 4 has 40 mH capacity, a sufficient effect is attained with 2 mH or the like small capacity of the auxiliary reactor 10.

According to Embodiment 2, the reactor 4 and diode 5 may be exchanged with each other. In that case, an anode of the diode 5 is connected to a connection part between the auxiliary reactor 10 and auxiliary capacitor 3 and the reactor 4 is connected between a cathode of the diode 5 and one end of the load 7.

As discussed hereinabove, the auxiliary reactor 10 of a small capacity is connected between the bridge-type rectification circuit 2 and the auxiliary capacitor 3 in the electric power unit of Embodiment 2. The effect of suppressing higher harmonics is enhanced furthermore by the addition of the compact and inexpensive part, namely, small-capacity auxiliary reactor 10. The electric power unit provided is compact and inexpensive.

Embodiment 3

Figure 5:
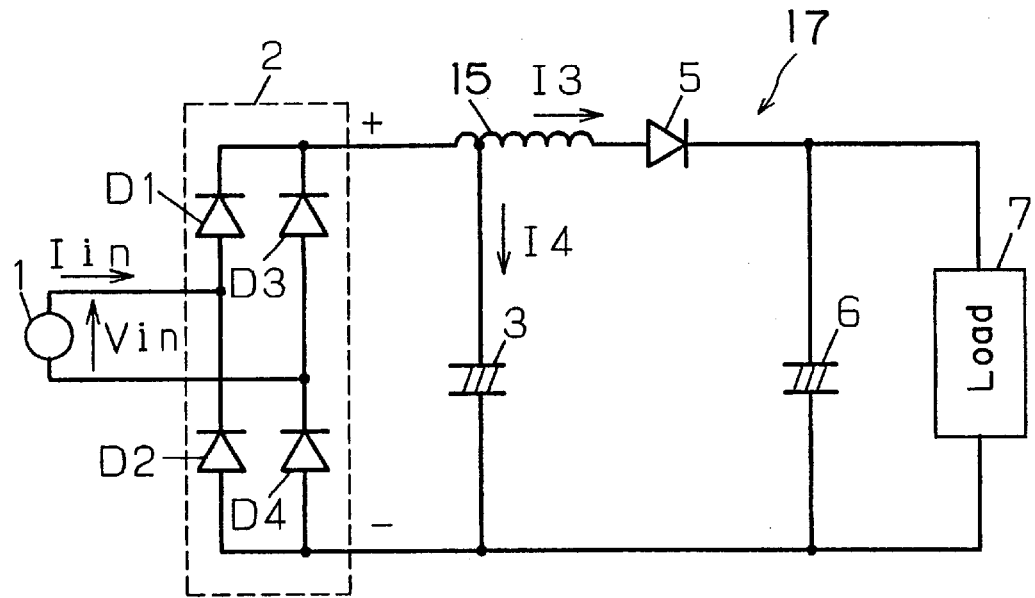
FIG. 5 is a circuit diagram of an electric power unit constituted according to an embodiment of the present invention.

FIG. 5 is a circuit diagram of an electric power unit according to an Embodiment 3 of the present invention. The parts in the same constitution as in FIG. 1 are denoted by the same reference numerals in FIG. 5 and the description of the parts will be omitted. Only different points will be discussed here, that is, the reactor 4 of FIG. 1 is replaced with a reactor 15 having a middle tap and, the auxiliary capacitor 3 is connected between the middle tap of the reactor 15 and the − output of the bridge-type rectification circuit 2. The electric power unit 1 of FIG. 1 becomes an electric power unit 17.

In FIG. 5, the electric power unit 17 consists of the alternating current power source 1, bridge-type rectification circuit 2, auxiliary capacitor 3, diode 5, smoothing capacitor 6 and aforementioned reactor 15 with the middle tap. The reactor 15 has its one end connected to the + output of the bridge-type rectification circuit 2 and the other end connected to the anode of the diode 5. Moreover, the reactor 15 has its middle tap connected to one end of the auxiliary capacitor 3. A position of the middle tap of the reactor 15 is set so that a reactance from the middle tap to a terminal at the side of the bridge-type rectification circuit 2 is sufficiently smaller than that from the middle tap to another terminal at the side of the diode 5.

The electric power unit 17 of the above constitution operates in the same manner as the electric power unit 12 of Embodiment 2, and the description of the operation is omitted.

The reactor of the electric power unit according to Embodiment 3 is the reactor 15 with a middle tap. Therefore, the auxiliary reactor 10 is eliminated in the electric power unit of this Embodiment 3 while the enhanced effect of restricting the higher harmonic current is maintained as much as in Embodiment 2. The electric power unit is turned more compact and inexpensive.

Embodiment 4

Figure 6:
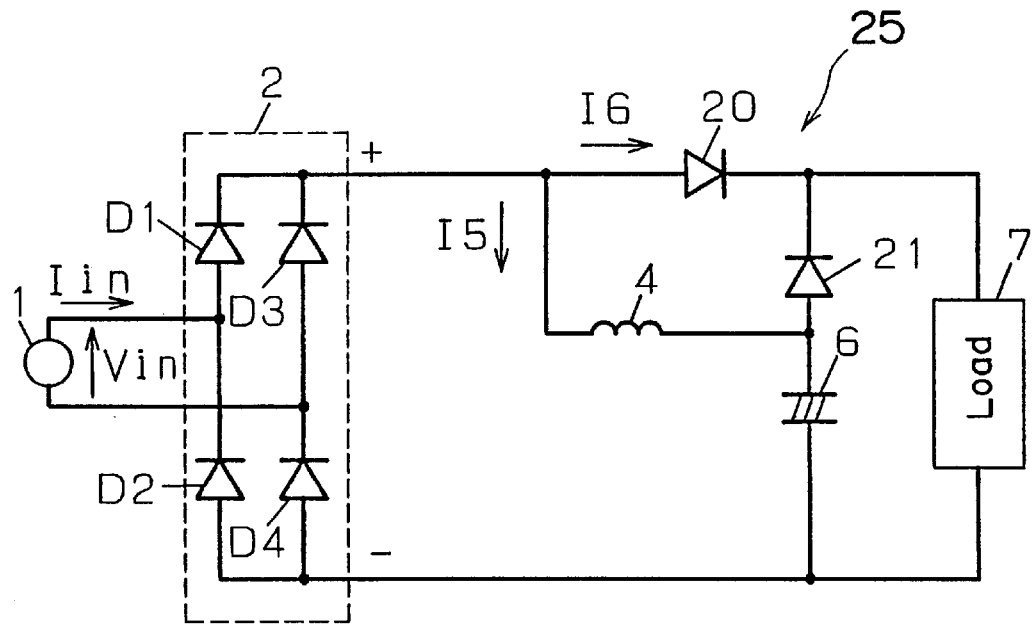
FIG. 6 is a circuit diagram of an electric power unit constituted according to an embodiment of the present invention.

FIG. 6 is a circuit diagram of an electric power unit according to an Embodiment 4 of the present invention, wherein parts of the same constitution as in FIG. 1 are designated by the same reference numerals, the description of which is not made here.

In FIG. 6, an electric power unit 25 consists of the alternating current power source 1, bridge-type rectification circuit 2, reactor 4, smoothing capacitor 6, a first diode 20 and a second diode 21. The reactor 4 is connected between the + output of the bridge-type rectification circuit 2 and one end of the smoothing capacitor 6. The other end of the smoothing capacitor 6 is connected to the − output of the bridge-type rectification circuit 2. An anode and a cathode of the first diode 20 are respectively connected to the + output of the bridge-type rectification circuit 2 and, a cathode of the second diode 21 and one end of the load 7. The second diode 21 is connected to a connection part between the reactor 4 and smoothing capacitor 6.

Figure 7:
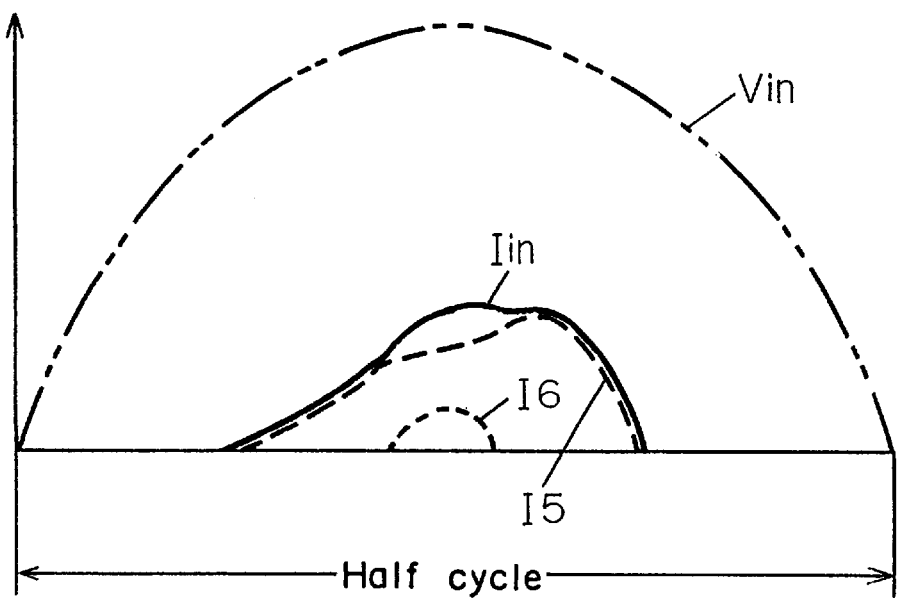
FIG. 7 is a diagram of waveforms of half a cycle at parts of the electric power unit of FIG. 6.

The operation of the electric power unit 25 constituted as above will be described with reference to FIGS. 6 and 7. FIG. 7 is a diagram of waveforms in half a cycle at parts of the electric power unit 25 of FIG. 6. As indicated in FIG. 7, the input voltage Vin from the alternating current power source 1 is a sine wave. A current I5 flowing in the reactor 4 shows a dull waveform because a charging current to the smoothing capacitor 6 is dulled at the reactor 4. When the input voltage Vin becomes higher than a voltage at both ends of the smoothing capacitor 6, a current I6 in the first diode 20 sends electricity to the load 7 not via the smoothing capacitor 6, but directly through the first diode 20. When the input voltage Vin becomes lower than the voltage at both ends of the smoothing capacitor 6, the electricity is supplied from the smoothing capacitor 6 to the load 7 via the second diode 21.

Therefore, the input current Iin becomes a sum of I5 and I6, representing a waveform as shown in FIG. 7. Referring to FIG. 7, in a section where the input voltage Vin is high, the electricity is fed directly to the load 7, without passed through the smoothing capacitor 6. As a result, a charging voltage to the smoothing capacitor 6 is decreased, a conduction section of the charging current is extended, and a peak value of the current is lowered, whereby the higher harmonics control effect is enhanced.

In the electric power unit according to Embodiment 4 of the present invention, two diodes, namely, first diode 20 and second diode 21 are added, thereby to use an output from the bridge-type rectification circuit 2 in two systems, specifically, to charge the smoothing capacitor 6 and to feed the electricity directly to the load 7. Accordingly, the higher harmonics suppression effect is increased although the electric power unit is compact and inexpensive.

Embodiment 5

Figure 8:
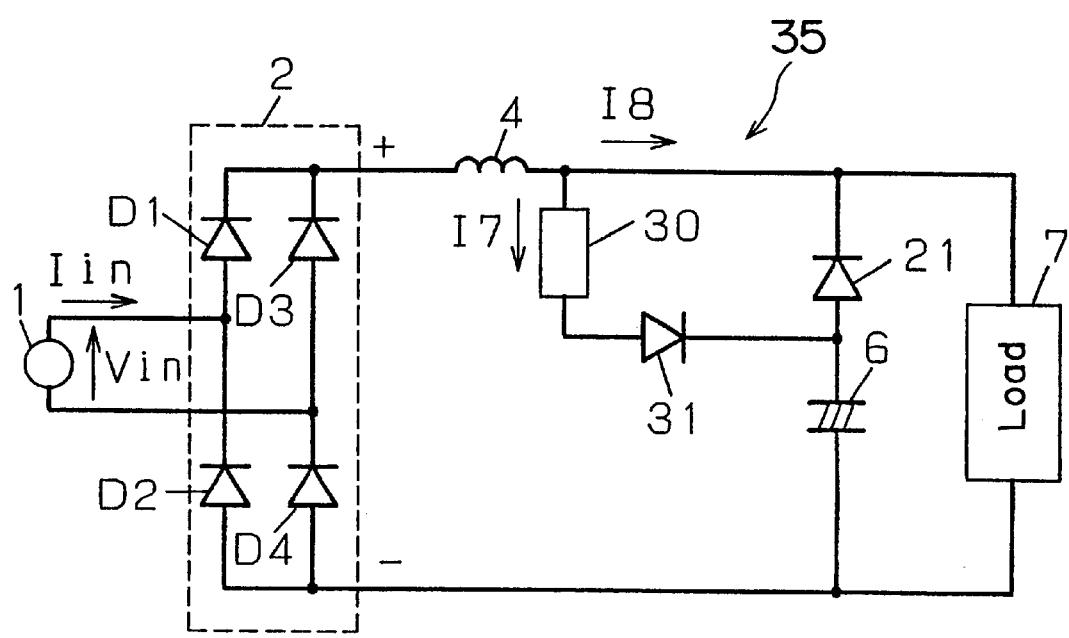
FIG. 8 is a circuit diagram of an electric power unit constituted according to an embodiment of the present invention.

FIG. 8 is a circuit diagram of an electric power unit according to an Embodiment 5 of the present invention. Parts of the same constitution as in FIG. 1 are designated by the same reference numerals and the description of the parts will be omitted herein.

An electric power unit 35 in FIG. 8 is constituted of the alternating current power source 1, bridge-type rectification circuit 2, reactor 4, smoothing capacitor 6, a voltage drop means 30, a first diode 31 and the second diode 21. The voltage drop means 30 is, for instance, a resistor, a series-connected diode, or the like means to decrease a voltage. The reactor 4 has its one end connected to the + output of the bridge-type rectification circuit 2 and the other end connected to one end of the voltage drop means 30 and one end of the load 7. The other end of the voltage drop means 30 is connected to an anode of the first diode 31. A cathode of the first diode 31 is connected to one end of the smoothing capacitor 6 and the anode of the second diode 21. The cathode of the second diode 21 is connected to a connection part of the reactor 4 and the load 7. The other end of the smoothing capacitor 6 is connected to the − output of the bridge-type rectification circuit 2.

Figure 9:
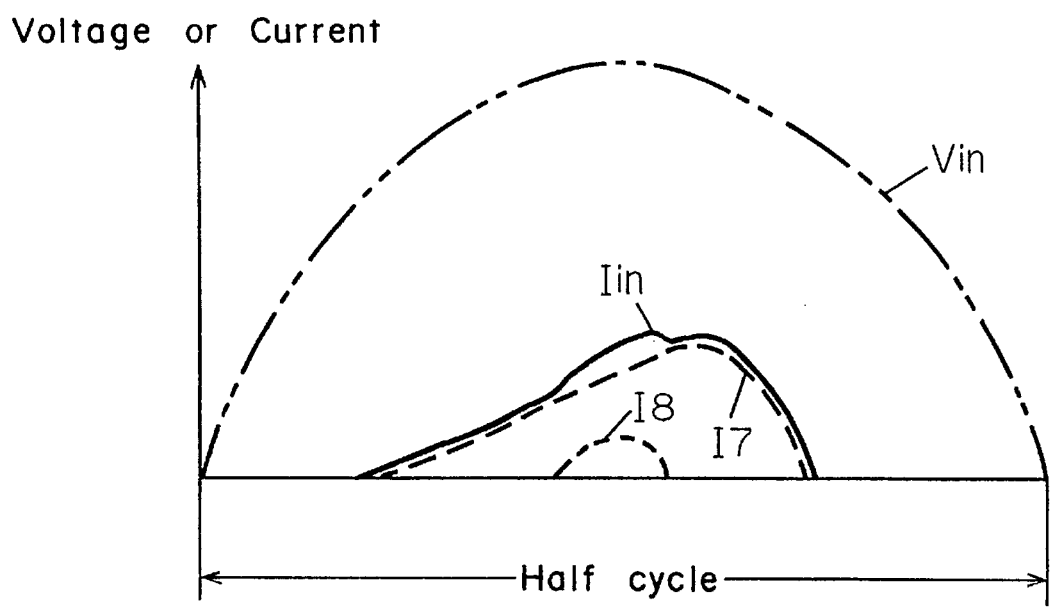
FIG. 9 is a diagram of waveforms of half a cycle at parts of the electric power unit of FIG. 8.

The operation of the electric power unit 35 of the above constitution will be described with reference to FIGS. 8 and 9. FIG. 9 is a diagram of waveforms of half a cycle at parts of the electric power unit 35. The input voltage Vin from the alternating current power source 1 is a sine wave, as illustrated in FIG. 9. A waveform of a current I7 running in the voltage drop means 30 is softened because a charging current to the smoothing capacitor 6 is dulled at the reactor 4 and the voltage drop means 30. A current I8 is not let through the smoothing capacitor 6, but is bypassed at the reactor 4 when the input voltage Vin is higher than a voltage at both ends of the smoothing capacitor 6. If the input voltage Vin is lower than the voltage at both ends of the smoothing capacitor 6, the electricity is supplied from the smoothing capacitor 6 to the load 7 via the second diode 21.

Therefore, the input current Iin becomes a total of I7 and I8, showing a waveform of FIG. 9. The electricity is directly sent to the load 7 without passing through the smoothing capacitor 6 in a section in FIG. 9 where the input voltage Vin is high. In consequence, a charging voltage to the smoothing capacitor 6 is lowered, the charging current is extended in conduction section, and a peak current is decreased. The effect of limiting higher harmonics is hence improved.

In the electric power unit according to Embodiment 5 as above, the voltage drop means 30 and first diode 31 are added and, an output of the bridge-type rectification circuit 2 is used in three kinds of systems, namely, to charge the smoothing capacitor 6, to directly supply the electricity to the load 7 and to decrease the charging voltage to the smoothing capacitor 6 at the voltage drop means 30. The electricity is directly fed, without passing the smoothing capacitor 6, in the vicinity of a peak value of a source voltage. Since higher harmonics at the time of charging the smoothing capacitor 6 are suppressed, an enhanced restriction effect to higher harmonics is exerted in the electric power unit in the compact and inexpensive constitution.

Embodiment 6

In every Embodiment 1–5 described above, the reactor has a constant capacity. Due to this constitution, the load current is increased depending on a state of the load 7, leading to a temperature rise of the reactor. The reactor is eventually required to have a large current capacity. An Embodiment 6 is devised for solving the inconvenience, in which the capacity of the reactor is varied in accordance with the state of the load 7 thereby to change the current capacity of the reactor. The constitution of the electric power unit in Embodiment 1 is used by way of example to describe Embodiment 6 although the electric power unit in each of Embodiments 2–5 applies the same way, the description of which will be accordingly omitted. In Embodiment 6, the load 7 is an inverter and a motor a revolution number of which is controlled by the inverter, e.g., a compressor of an electric refrigerator.

Figure 10:
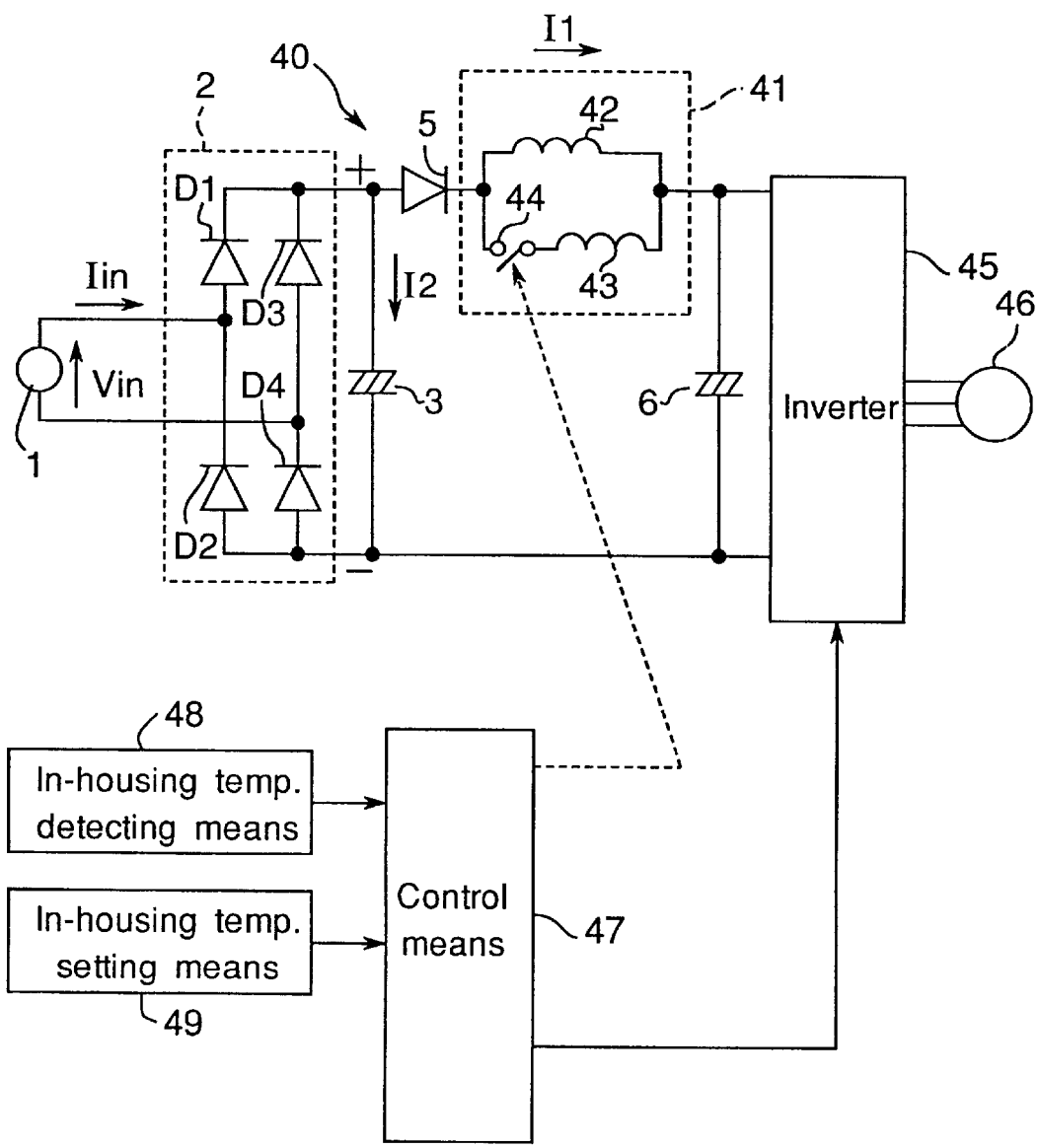
FIG. 10 is a circuit diagram of an electric power unit constituted according to an embodiment of the present invention.

FIG. 10 is a schematic circuit diagram of an electric power unit according to Embodiment 6. Parts of the same constitution in FIG. 10 as in FIG. 1 are designated by the same reference numerals and the description of the parts will be omitted. An electric power unit 40 in FIG. 10 is constituted of the alternating current power source 1, bridge-type rectification circuit 2, auxiliary capacitor 3, a reactor circuit 41, diode 5 and smoothing capacitor 6. The reactor circuit 41 comprises a first reactor 42 flowing a load current, a second reactor 43 connected in parallel to the first reactor 42 for bypassing the load current, and a switching means 44 for connecting the second reactor 43 in parallel to the first reactor 42. An inverter 45 and a compressor 46 constitute the load 7 of FIG. 1. The inverter 45 controls a revolution number of the compressor 46 in accordance with a control signal indicating the revolution number of the compressor 46 which is input from a control means 47.

The auxiliary capacitor 3 has its one end and the other end connected respectively to the + output and − output of the bridge-type rectification circuit 2. The anode of the diode 5 is connected to the + output of the bridge-type rectification circuit 2. In the reactor circuit 41, one ends of the first reactor 42 and switching means 44 are connected with each other, and the cathode of the diode 5 is connected to the connecting point of the first reactor 42 and switching means 44. The other end of the switching means 44 is connected to one end of the second reactor 43. The other end of the first reactor 42 is connected to the other end of the second reactor 43 and, the connecting point of the first reactor 42 and second reactor 43 is connected to one end of the smoothing capacitor 6. The other end of the smoothing capacitor 6 is connected to the − output of the bridge-type rectification circuit 2. The inverter 45 connected to both ends of the smoothing capacitor 6 is connected to the compressor 46 and also to the control means 47 which is in turn connected to a temperature detecting means 48 for detecting a temperature inside an electric refrigerator (referred to as a refrigerator hereinafter) and a temperature setting means 49 for setting a temperature in the refrigerator. The control means 47 controls switching of the switching means 44 and therefore, strictly speaking, the electric power unit 40 includes the control means 47.

In the above-described constitution, when the switching means 44 is turned ON, the second reactor 43 is connected in parallel to the first reactor 42. When the switching means 44 is turned OFF, the second reactor 43 is separated from the circuit, whereby the reactor circuit 41 is constituted simply of the first reactor 42. From this, when the switching means 44 is ON, an inductance L of the reactor circuit 41 is expressed by an equation (1) assuming that an inductance of the first reactor 42 is La and an inductance of the second reactor 43 is Lb;

$$L = La \times Lb / (La + Lb) \qquad (1)$$

In this case, if La is 20 mH and Lb is 10 mH, L is 6.7 mH which is lower than a value when the reactor circuit 41 is formed of the first reactor 42 alone with the switching means 44 turned OFF.

Meanwhile, in the case where the switching means 44 is ON, a current capacity Imax of the reactor circuit 41 is expressed by an equation (2) assuming that a current capacity of the first reactor 42 is Iamax and a current capacity of the second reactor 43 is Ibmax;

$$Imax = Iamax + Ibmax \qquad (2)$$

When the switching means is in the ON state, the current capacity Imax of the reactor circuit 41 becomes a sum of the current capacities Iamax and Ibmax of the first and second reactors 42, 43. In contrast, when the switching means 44 is in the OFF state, the current capacity of the reactor circuit 41 is equal to the current capacity Iamax of the first reactor 42. In consequence, the inductance L of the reactor circuit 41 decreases and the current capacity Imax increases when the switching means 44 is ON, whereas the inductance L increases and the current capacity Imax is reduced when the switching means 44 is OFF.

The control means 47 instructs the revolution number of the compressor 46 to the inverter 45 in accordance with a temperature difference of the temperature detected by the temperature detecting means 48 and the temperature set by the temperature setting means 49. For example, when the temperature difference between the compartment temperature and set temperature is 5° C., the control means 47 sends a revolution number command to the inverter 45 so that the compressor 46 is driven with 3600 r/m. Similarly, when the temperature difference is 0–5° C., the revolution number is controlled to be 3000 r/m. With the temperature difference of −2 to 0° C., the revolution number is set at 2400 r/m. If the temperature difference is −2° C. or smaller, the revolution number of the compressor 46 is 0 r/m. The control means 47 turns ON the switching means 44 when the revolution number command indicates 3600 r/m and turns OFF the switching means 44 except the above occasion.

Figure 11:
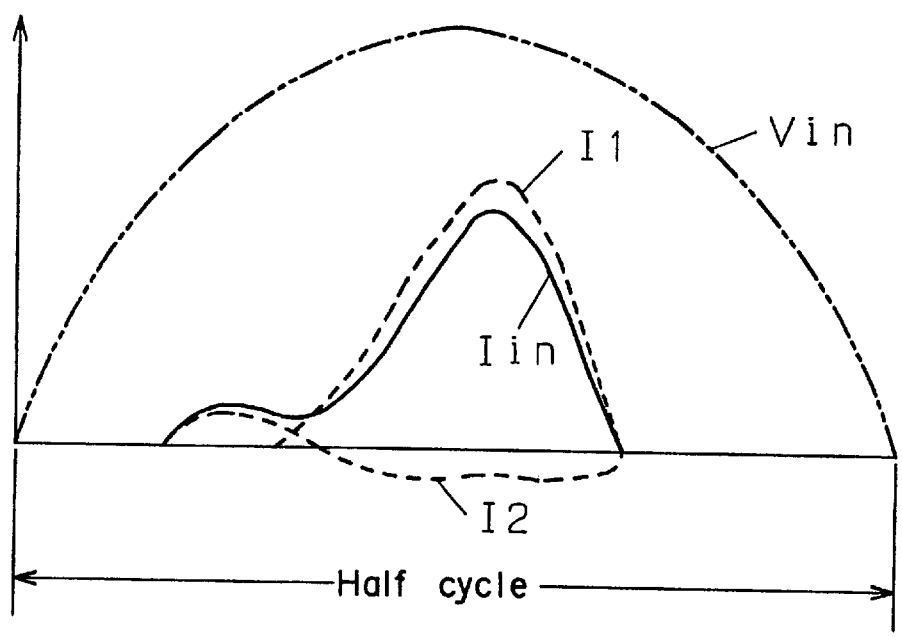
FIG. 11 is a diagram of waveforms of half a cycle at parts of the electric power unit of FIG. 10.
Figure 12:
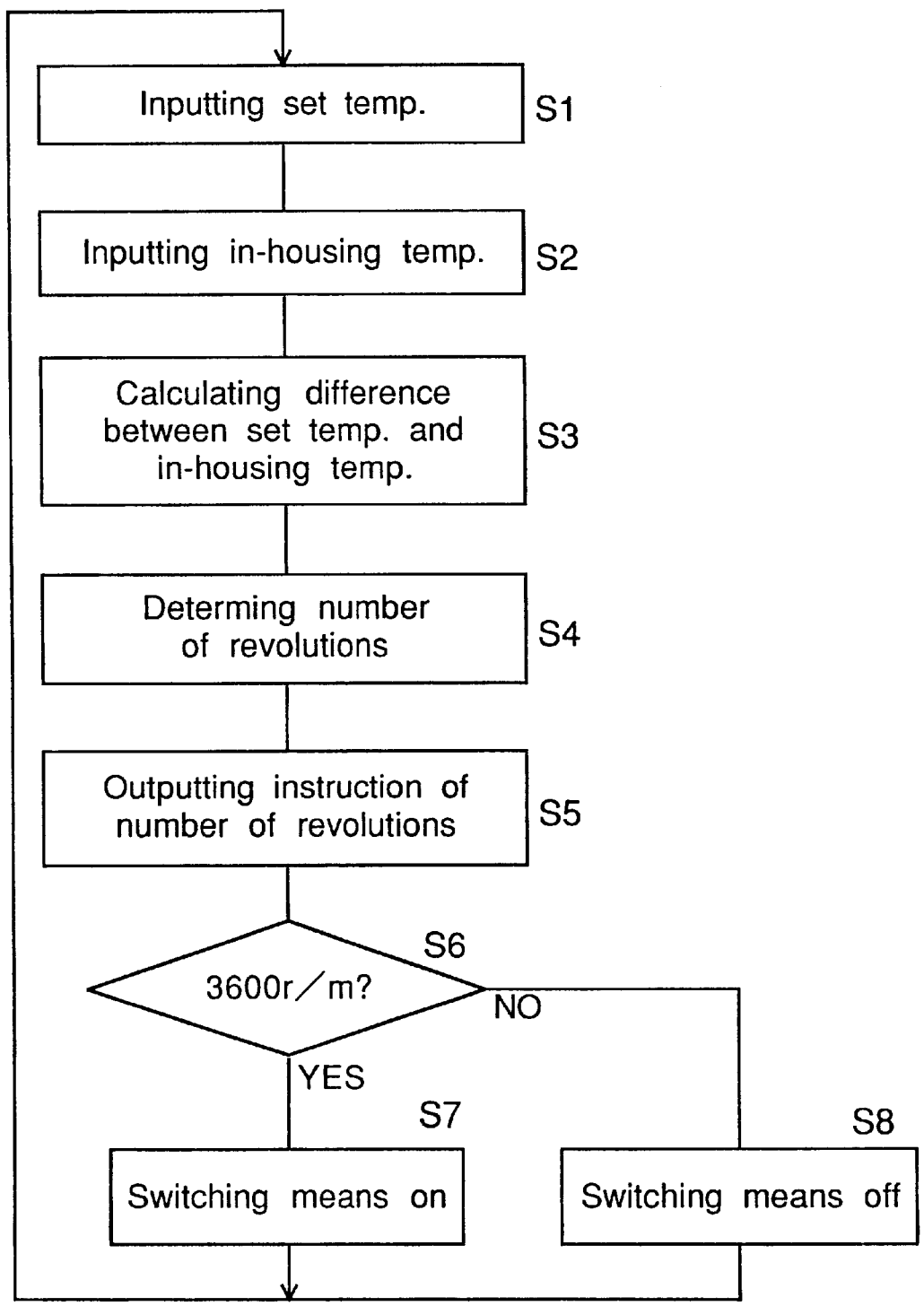
FIG. 12 is a flow chart of operations of the electric power unit and its peripheral parts of FIG. 10.

The thus-constituted electric power unit of the refrigerator operates in a manner as will be detailed below with reference to FIGS. 10–12. FIG. 11 is a diagram of waveforms of a half cycle at parts of the electric power unit 40 of FIG. 10. FIG. 12 is a flow chart exemplifying the operation of the electric power unit and its peripheral parts of FIG. 10.

As is clearly shown in FIG. 11, the input voltage Vin from the alternating current power source 1 is a sine wave. The current I1 flowing in the reactor circuit 41 has a bent waveform because a charging current to the smoothing capacitor 6 is dulled at the reactor circuit 41. The current I2 in the auxiliary capacitor 3 starts charging when the input voltage Vin becomes higher than a voltage at both ends of the auxiliary capacitor 3. Electric charges are drawn to the auxiliary capacitor 3 when the smoothing capacitor 6 is charged by the reactor circuit 41. In other words, the voltage at both ends of the auxiliary capacitor 3 is sufficiently low when the current I1 finishes to flow, thus letting the current to start running at a next cycle sufficiently earlier than in the general case of charging. The input current Iin becomes a sum of the currents I1 and I2, showing a waveform indicated in FIG. 11.

The compressor 46 of the refrigerator is driven at high speed when the compartment temperature is high. Because of a large cooling load impressed on this occasion, a great quantity of current flows to the compressor 46 and the current I1 is increased. A ratio of the higher harmonic components decreases as the current I1 is increased. The ratio of the higher harmonic components is 72%, 57% when the inductance L of the reactor circuit 41 is 10 mH and the current I1 is 1 A, 2 A in actual experiments.

The operation of the electric power unit and its peripheral parts of FIG. 10 will be described with reference to FIG. 12.

In FIG. 12, the control means 47 inputs the set temperature from the setting means 49 in step S1, and inputs the compartment temperature detected by the detecting means 48 in step S2. In step S3, the control means 47 calculates a difference of the input set temperature and compartment temperature. A revolution number for driving the compressor 46 is determined in step S4. The determined revolution number is sent out as the revolution number command to the inverter 45 in step S5. Thereafter, in step S6, the control means 47 detects whether or not the determined revolution number is 3600 r/m, with replying an affirmative answer if the revolution number is 3600 r/m. In step S7, the control means 47 turns ON the switching means 44 and returns to step S1. If the answer in step S6 is negative, in other words, the revolution number is smaller than 3600 r/m, the control means 47 switches OFF the switching means 44 in step S8 and returns to step S1.

Assuming that the inductance La and current capacity Iamax of the first reactor 42 are 10 mH and 1 A, and the inductance Lb and current capacity Ibmax of the second reactor 43 are 10 mH and 1 A, the inductance L and current capacity Imax of the reactor circuit 41 become 5 mH and 2 A at the application time of a high load, i.e., when the current I1 is increased and higher harmonic components are lessened. On the other hand, at the time of a low load when the current I1 is decreased and higher harmonic components are increased, the inductance L and current capacity Imax of the reactor circuit 41 become 10 mH and 1 A. The ratio of higher harmonic components with the current I1 being 2 A is approximately 69% even if the inductance L of the reactor circuit 41 is set at 5 mH, which is hardly different from 72% when the inductance L is 10 mH and current I1 is 1 A. Therefore, there is no problem in decreasing the inductance value of the reactor circuit 41 when the current I1 is increased.

As above, according to the electric power unit of Embodiment 6, the waveform of the input current Iin is increased in the width in comparison with that of the general power unit and the peak value of the current is lowered, so that higher harmonics are suppressed. When the current I1 is increased and higher harmonic components are reduced, that is, when the compressor 46 is driven with a high revolution number, the inductance L of the reactor circuit 41 is decreased and the current capacity Imax of the reactor circuit 41 is increased. A reactor of a large current capacity and a large inductance is thus eliminated from the electric power unit. A direct current resistance of the reactor circuit 41 is reduced as well. Accordingly, the loss in the reactor circuit 41 when the current I1 is large, namely, the compressor 46 is rotated at high speed is reduced. As compared with a general electric power unit using the higher harmonics control method with the use of a passive filter (only a reactor), the electric power unit of Embodiment 6 can effectively suppress higher harmonics owing to the auxiliary capacitor 3, diode 5, capacity variable reactor circuit 41 and control means 47 switching the capacity of the reactor circuit 41 in accordance with the set revolution number of the compressor 46. Since the parts constituting the electric power unit are considerably small and inexpensive, the electric power unit itself becomes compact and low-cost with the loss reduced.

Embodiment 7

The switching means 44 is controlled by the control means 47 in accordance with the set revolution number of the compressor 46 in Embodiment 6. This control to the switching means 44 may alternatively be carried out in accordance with a temperature of the outside air of the refrigerator, as embodied in an Embodiment 7 to be described below.

Figure 13:
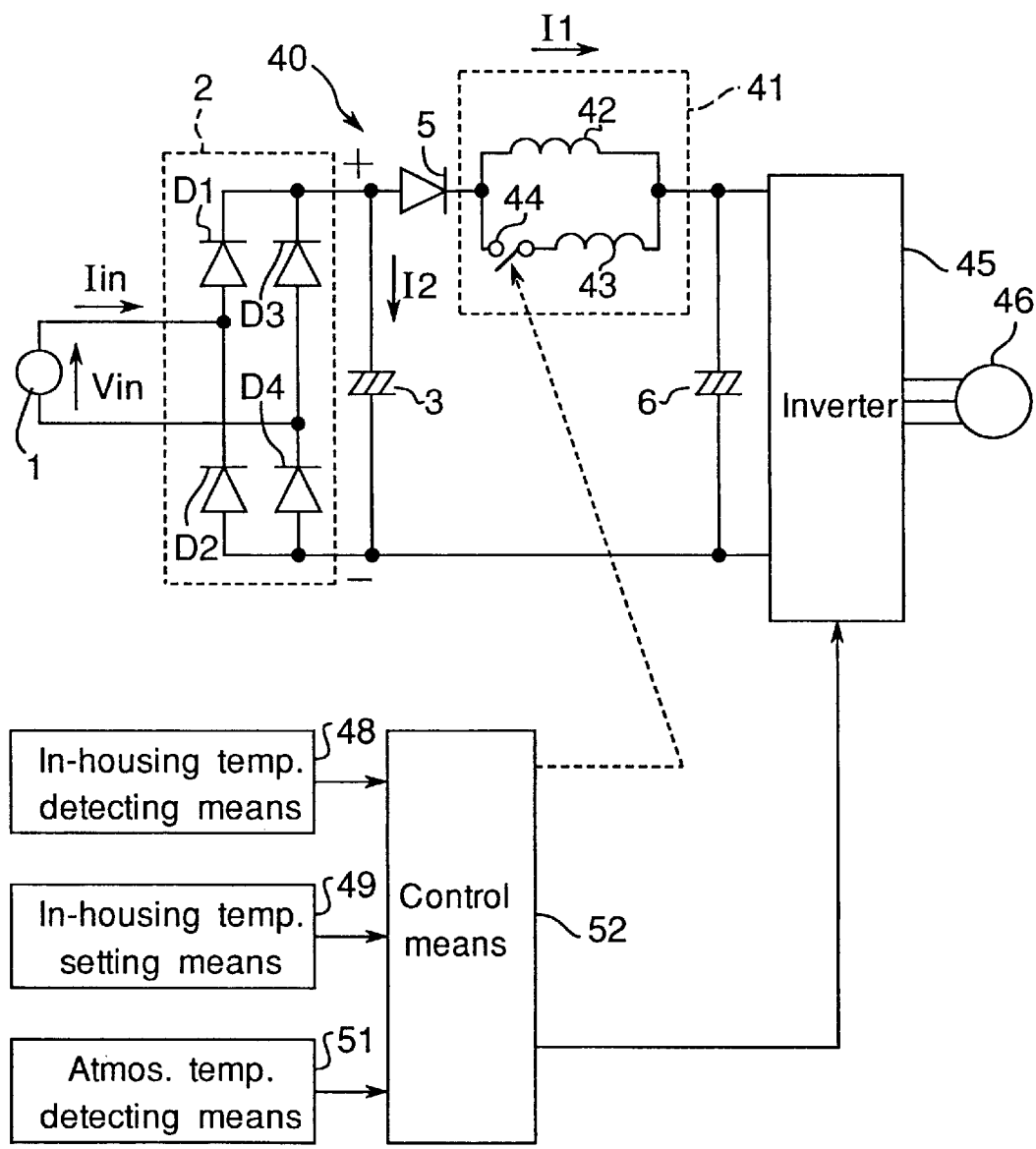
FIG. 13 is a circuit diagram of an electric power unit constituted according to an embodiment of the present invention.

FIG. 13 is a circuit diagram of an electric power unit according to Embodiment 7, in which parts constituted in the same manner as in FIG. 10 are indicated by the same reference numerals. The description of the parts is omitted and only a different point from FIG. 10 will be discussed here. The constitution of the electric power unit in Embodiment 7 is based on Embodiment 1, similar to the case of Embodiment 6, although Embodiments 2 through 5 apply the same way. Moreover, in Embodiment 7, the load 7 in Embodiment 1 is constituted of an inverter and a motor a revolution number of which is controlled by the inverter, for example, a compressor of a refrigerator, as in Embodiment 6.

FIG. 13 is different from FIG. 10 in an air temperature detecting means 51 for detecting a temperature of the outside air of the refrigerator. The control means 47 consequently controls the switching means 44 in accordance with the temperature detected by the detecting means 51. The control means is denoted by a reference numeral 52 in FIG. 13.

In FIG. 13, the air temperature detecting means 51 is connected to the control means 52. The control means 52 turns ON the switching means 44 if the air temperature detected by the detecting means 51 is high, e.g., not lower than 30° C., or turns OFF the switching means 44 if the air temperature is lower than 30° C., because a higher level of cooling efficiency is needed when the refrigerator operates at a high air temperature than at a low air temperature, with the current in the compressor 46 being increased and the current I1 being large. The ratio of higher harmonic components becomes smaller as the current I1 is increased. Experiments reveal the ratio of 72%, 57% when the inductance L of the reactor circuit 41 is 10 mH and the current I1 is 1 A, when the inductance is the same and the current I1 is 2 A. Since the control means 52 controls to switch the switching means 44 as above, strictly speaking, the electric power unit 40 includes the control means 52.

Figure 14:
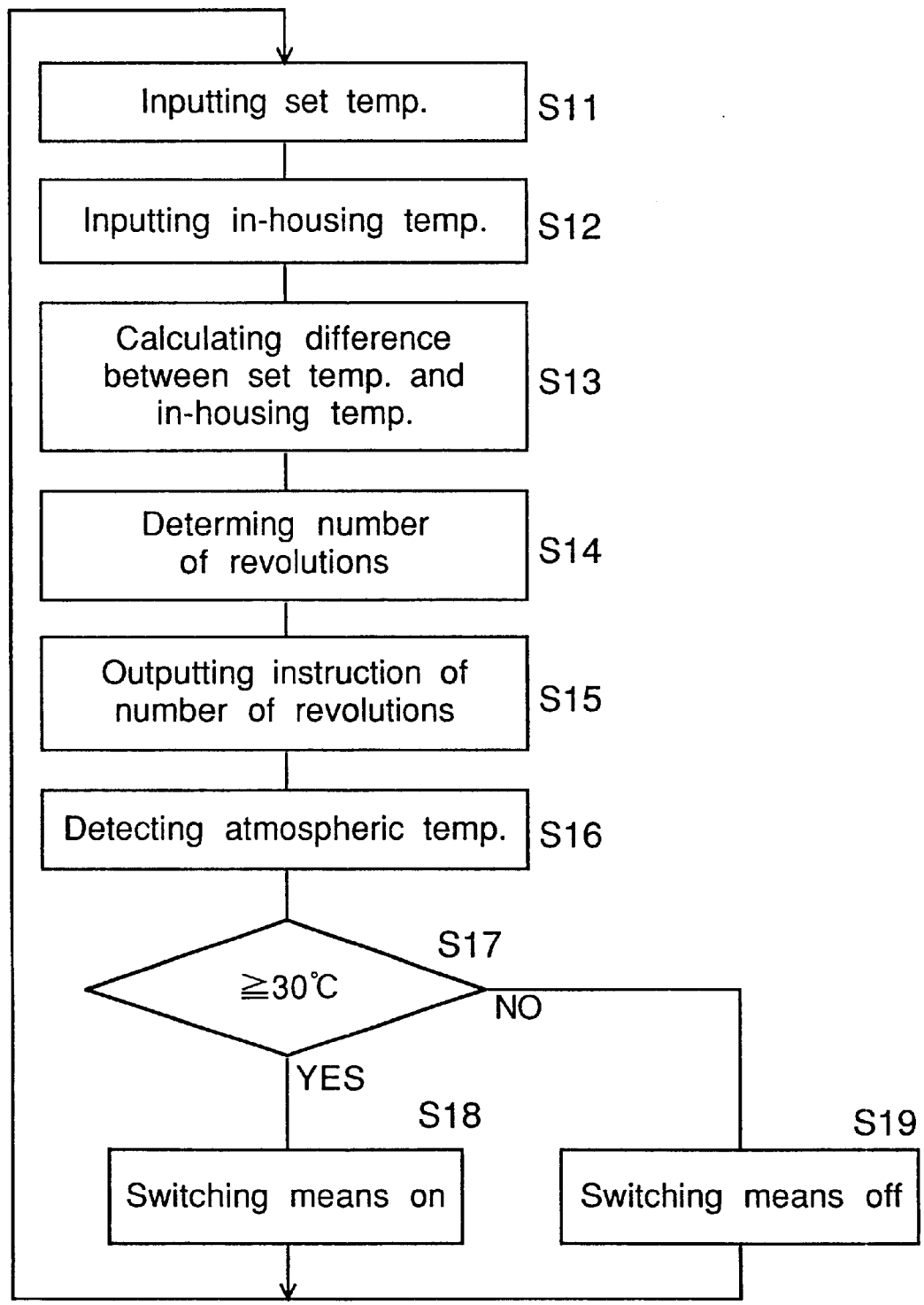
FIG. 14 is a flow chart of operations of the electric power unit and its peripheral parts of FIG. 13.

FIG. 14 is a flow chart of the operation of the electric power unit and its peripheral parts of FIG. 13.

In FIG. 14, the control means 52 inputs the set temperature from the temperature setting means 49 in step S11 and inputs the compartment temperature detected by the temperature detecting means 48 in step S12. The control means 52 then calculates a difference of the input set temperature and compartment temperature in step S13, determines a revolution number for driving the compressor 46 in step S14, and sends the determined revolution number to the inverter 45 as a revolution number command in step S15. The control means 52 further inputs the outside air temperature detected by the detecting means 51 in step S16, judges in step S17 whether the input temperature is 30° C. or higher, turns ON the switching means 44 in step S18 if the input temperature is not lower than 30° C., and returns to step S11. If the input air temperature is lower than 30° C. in step S17, the control means 52 switches OFF the switching means 44 in step S19, then returns to step S11.

Similar to Embodiment 6, the inductance L of the reactor circuit 41 becomes small and the current capacity Imax is increased when the current I1 is increased and higher harmonic components are lessened, i.e., at the time of a high load. On the other hand, the inductance of the reactor circuit 41 is increased and the current capacity Imax is decreased when the current I1 becomes small and the higher harmonic components are increased, in other words, at the time of a low load. The inductance of the reactor circuit 41 may be adapted to decrease when the current I1 increases, with no trouble brought about, similar to Embodiment 6. Waveforms at parts of the electric power unit 40 of FIG. 13 are the same as in FIG. 11, and therefore a diagram of the waveforms is not submitted here.

In the electric power unit of Embodiment 7, the waveform of the input current Iin is enlarged in width as compared with that in the general arrangement and moreover the peak value of the current is decreased, whereby the higher harmonics are controlled. Since the inductance L of the reactor circuit 41 is changed to be small and the current capacity Imax is increased when the current I1 is increased and higher harmonic components are reduced at the high air temperature, a reactor of a large current capacity and a large inductance value is not necessary in Embodiment 7. Moreover, since the direct current resistance of the reactor circuit 41 is decreased, the loss at the reactor circuit 41 when the current I1 is large in the case of the high air temperature is reduced. Accordingly, in comparison with a general electric power unit adopting the higher harmonics control method by means of a passive filter (only a reactor), the electric power unit of Embodiment 7 realizes effective suppression of higher harmonics because of the auxiliary capacitor 3, diode 5, capacity variable reactor circuit 41 and control means 52 switching the capacity of the reactor circuit 41 in accordance with the outside air temperature. These parts constituting the electric power unit are very small and inexpensive, and therefore the electric power unit itself becomes compact and low-cost with the loss reduced.

The control means 52 of Embodiment 7 may be designed to switch the capacity of the reactor circuit 41 in accordance with the set revolution number of the compressor 46 besides the outside air temperature, like the control means 47 in Embodiment 6.

Embodiment 8

According to Embodiment 6, the control means 47 controls to switch the switching means 44 in accordance with the set revolution number of the compressor 46. However, the switching means 44 may be controlled in accordance with a current running in the motor driving the compressor 46, which is realized in Embodiment 8 of the present invention.

Figure 15:
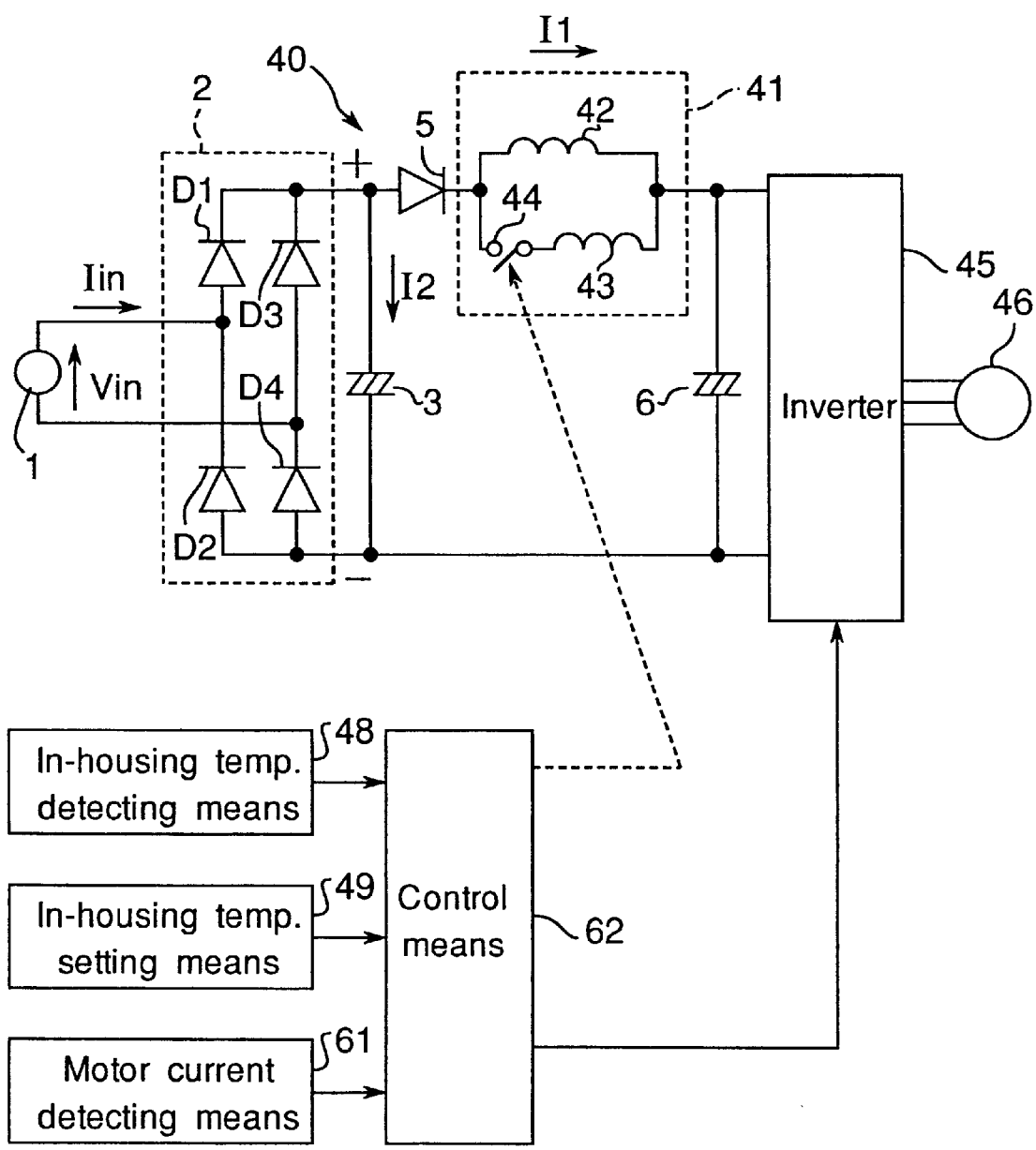
FIG. 15 is a circuit diagram of an electric power unit constituted according to an embodiment of the present invention.

FIG. 15 is a circuit diagram of an electric power unit according to Embodiment 8. Parts of the same constitution as in FIG. 10 are designated by the same reference numerals in FIG. 15. The description of the same parts is omitted and only a different point will be depicted hereinbelow. At the same time, the constitution of the electric power unit of Embodiment 1 is utilized to describe this Embodiment 8, as in the case of Embodiment 6, although the description of each electric power unit in Embodiments 2–5 is also applicable and not indicated herein. According to Embodiment 8, similar to Embodiment 6, the load 7 in Embodiment 1 is represented by an inverter and a motor a revolution number of which is controlled by the inverter, e.g., a compressor of an electric refrigerator.

What is different from FIG. 10 is a motor current detecting means 61 added for detecting a current running in the motor (not shown) driving the compressor 46. The control means 47 controls the switching means 44 in accordance with the motor current detected by the detecting means 61. The control means in FIG. 10 is denoted by a reference numeral 62 in FIG. 15.

In FIG. 15, the motor current detecting means 61 is connected to the control means 62 which switches ON the switching means 44 when the motor current detected by the motor current detecting means 61 is large, for example, not smaller than 1.5 A, or switches OFF when the motor current is smaller than 1.5 A, because the current I1 is increased in accordance with an increase of the current running to the compressor 46. The ratio of higher harmonic components decreases as the current I1 is increased. From experiments, the ratio of higher harmonic components is 72% when the inductance L of the reactor circuit 41 is 10 mH and the current I1 is 1 A. The ratio is 57% when the current I1 is 2 A. The control means 62 controls switching of the switching means 44 as above and therefore the electric power unit 40 includes, strictly, the control means 62.

Figure 16:
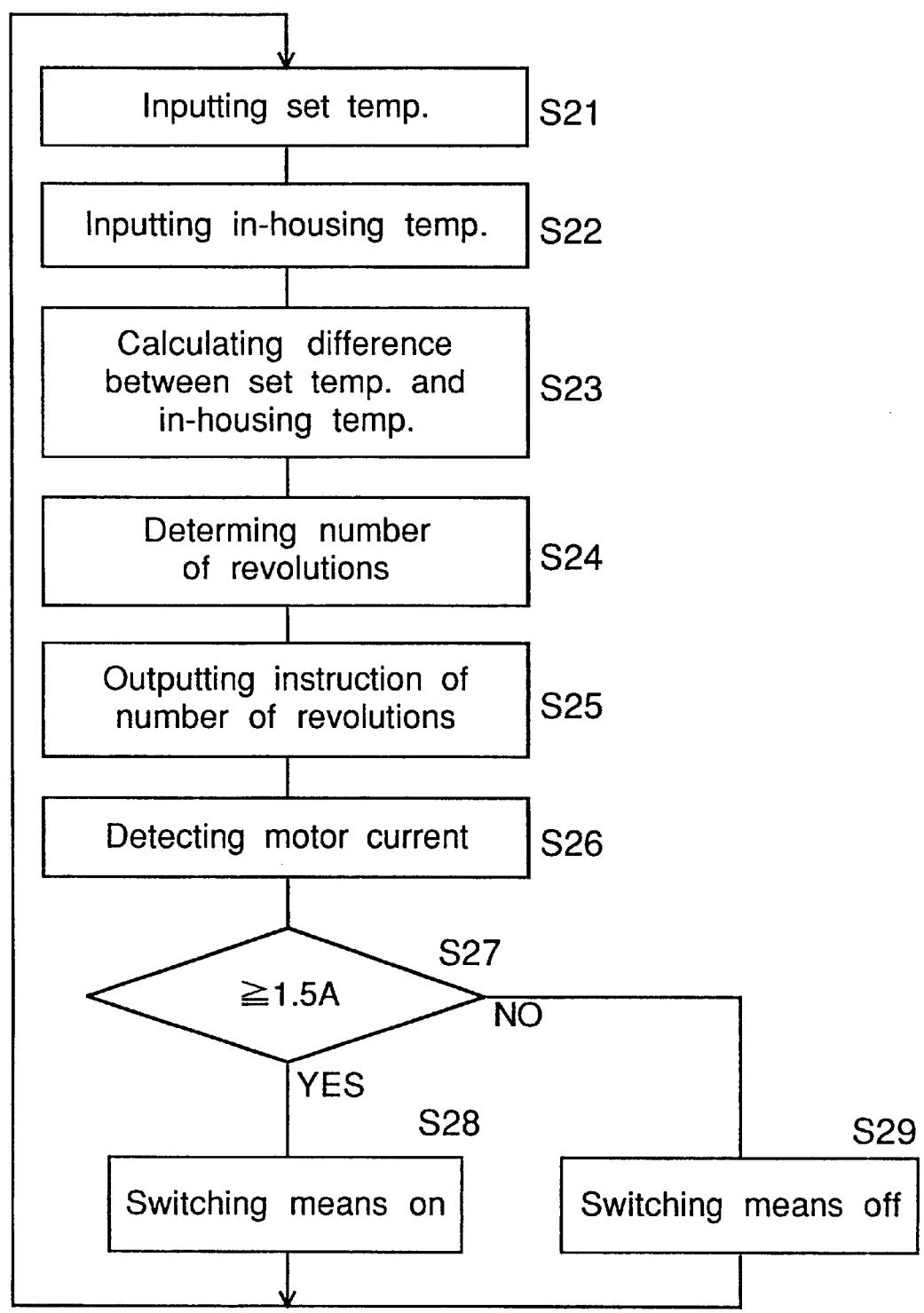
FIG. 16 is a flow chart of operations of the electric power unit and its peripheral parts of FIG. 15.

FIG. 16 is a flow chart of an example of operations of the electric power unit of FIG. 15 and its peripheral parts. The operation of the electric power unit of FIG. 15 and its peripheral parts will be discussed now with reference to FIG. 16.

In FIG. 16, the control means 62 inputs a set temperature from the temperature setting means 49 in step S21, inputs a compartment temperature from the temperature detecting means 48 in step S22. Then, in step S23, the control means 62 calculates a difference of the input set temperature and compartment temperature. In step S24, a revolution number for driving the compressor 46 is determined, which is sent to the inverter 45 in step S25 as a revolution number command. The control means 62 inputs in step S26 a motor current detected by the motor current detecting means 61. Judging whether the input motor current is 1.5 A or larger in step S27, the control means 62 answers affirmatively if the motor current is 1.5 A or larger, turns ON the switching means 44 in step S28 and returns to step S21. If the motor current is smaller than 1.5 A in step S27, the control means 62 turns OFF the switching means 44 in step S29 and returns to step S21.

Similar to Embodiment 6, the inductance L of the reactor circuit 41 is decreased and the current capacity Imax is increased at the time of a high load, namely, when the current I1 is increased and higher harmonic components are lessened. To the contrary, the inductance L is increased and the current capacity Imax is decreased at the time of a low load when the current I1 is reduced and higher harmonic components are increased. Also similar to Embodiment 6, it is not inconvenient to decrease the inductance L of the reactor circuit 41 when the current I1 is increased. A diagram of waveforms of a half cycle in the electric power unit 40 of FIG. 15 is the same as shown in FIG. 11 and therefore not indicated here.

As described above, the electric power unit according to Embodiment 8 has the waveform of the input current Iin enlarged in width as compared with that in the general case, whereby the peak value is lowered. Higher harmonics are hence limited. Since the inductance L of the reactor circuit 41 is made smaller and the current capacity Imax is increased when the motor current is large, that is, when the current I1 is increased and higher harmonic components are reduced, there is no need to employ a reactor of a large current capacity and a large inductance. In addition, since the direct current resistance of the reactor circuit 41 is decreased, the loss at the reactor circuit 41 when the motor current is increased thereby to increase the current I1 is lessened. In comparison with a general electric power unit using the higher harmonics control method by a passive filter (only a reactor), the electric power unit of Embodiment 8 provided with the auxiliary capacitor 3, diode 5, capacity variable reactor circuit 41 and control means 62 varying the capacity of the reactor circuit 41 in accordance with the motor current can effectively restrict higher harmonics. With parts constituting the electric power unit being considerably compact and inexpensive, the electric power unit is compact, low-cost and accompanies little loss.

In Embodiment 8, the control means 62 may be so adapted as to switch the capacity of the reactor circuit 41 in accordance with the set revolution number of the compressor 46 as well as the motor current, like the control means 47 in Embodiment 6.

Embodiment 9

The control means 47 in Embodiment 6 controls switching of the switching means 44 in accordance with the set revolution number of the compressor 46. Otherwise, the switching means 44 is controllable depending on a temperature of the first reactor 42, as achieved in an Embodiment 9 to be described hereinbelow.

Figure 17:
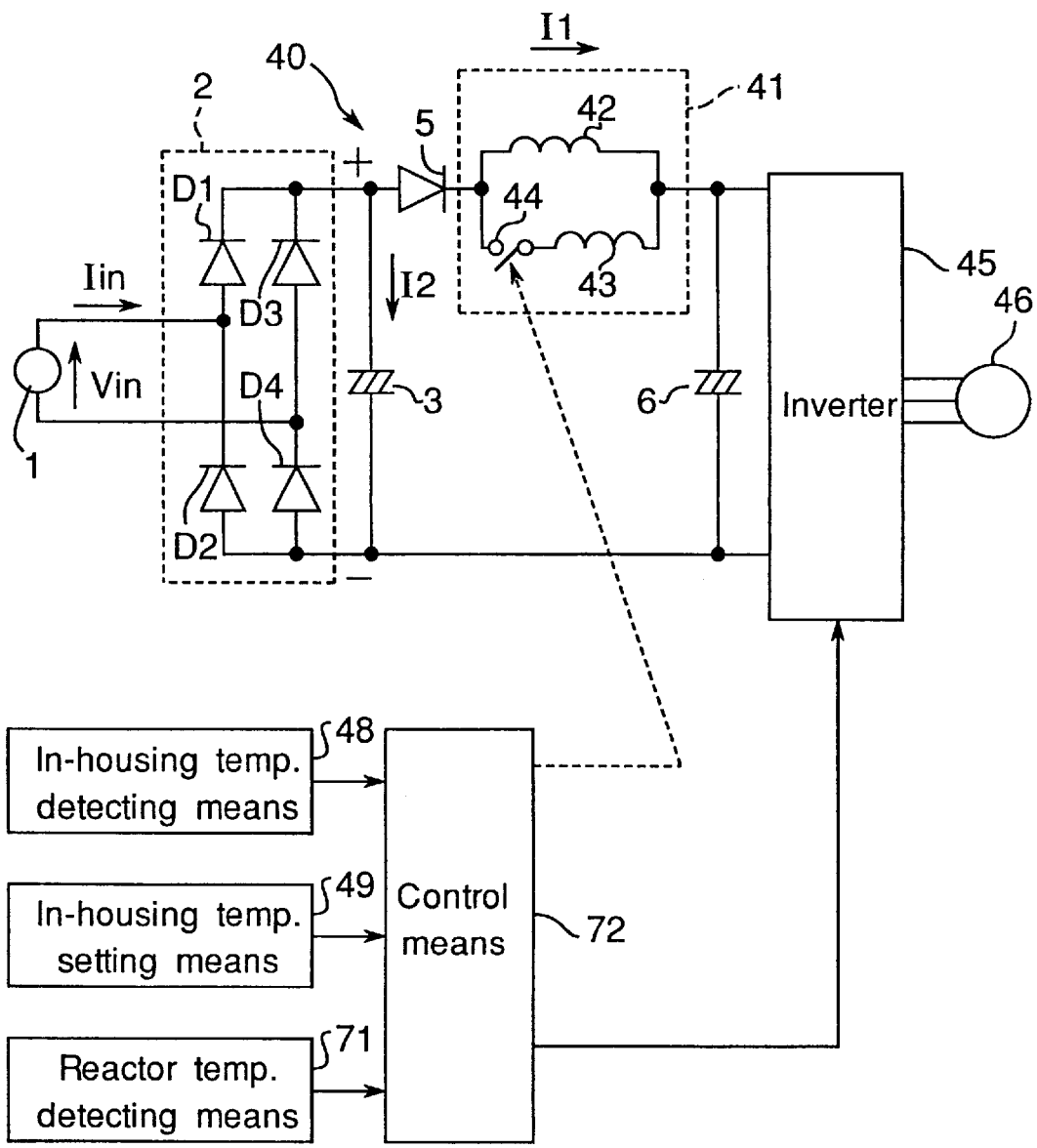
FIG. 17 is a circuit diagram of an electric power unit constituted according to an embodiment of the present invention.

FIG. 17 is a circuit diagram of an electric power unit according to Embodiment 9 of the present invention, wherein parts of the same constitution as in FIG. 10 are denoted by the same reference numerals, the description of which will be abbreviated here. Similar to Embodiment 6, the electric power unit of Embodiment 9 is based on the constitution of Embodiment 1 although each Embodiment 2–5 is applicable the same way. Likewise, the load 7 of Embodiment 1 is represented by an inverter and a motor a revolution number of which is controlled by the inverter, for example, a compressor of an electric refrigerator.

A difference of FIG. 17 from FIG. 10 is a reactor temperature detecting means 71 added to detect a temperature of the first reactor 42 of the reactor circuit 41. The control means 47 controls switching of the switching means 44 based on the temperature of the first reactor 42 detected by the reactor temperature detecting means 71. The control means is designated by a control means 72 in FIG. 17 of Embodiment 9.

Referring to FIG. 17, the reactor temperature detecting means 71 is connected to the control means 72. The control means 72 turns ON the switching means 44 if the first reactor 42 has a high temperature, e.g., not lower than 80° C. If the first reactor 42 is lower than 80° C., the control means 72 switches OFF the switching means 44. This is because the current I1 is increased when the temperature of the first reactor 42 is high. The ratio of higher harmonic components decreases as the current I1 is increased, specifically, 72% when the inductance L of the reactor circuit 41 is 10 mH and the current I1 is 1 A, and 57% when the current I1 is 2 A. The control means 72 controls switching of the switching means 44 as above and therefore the electric power unit 40 includes the control means 72.

Figure 18:
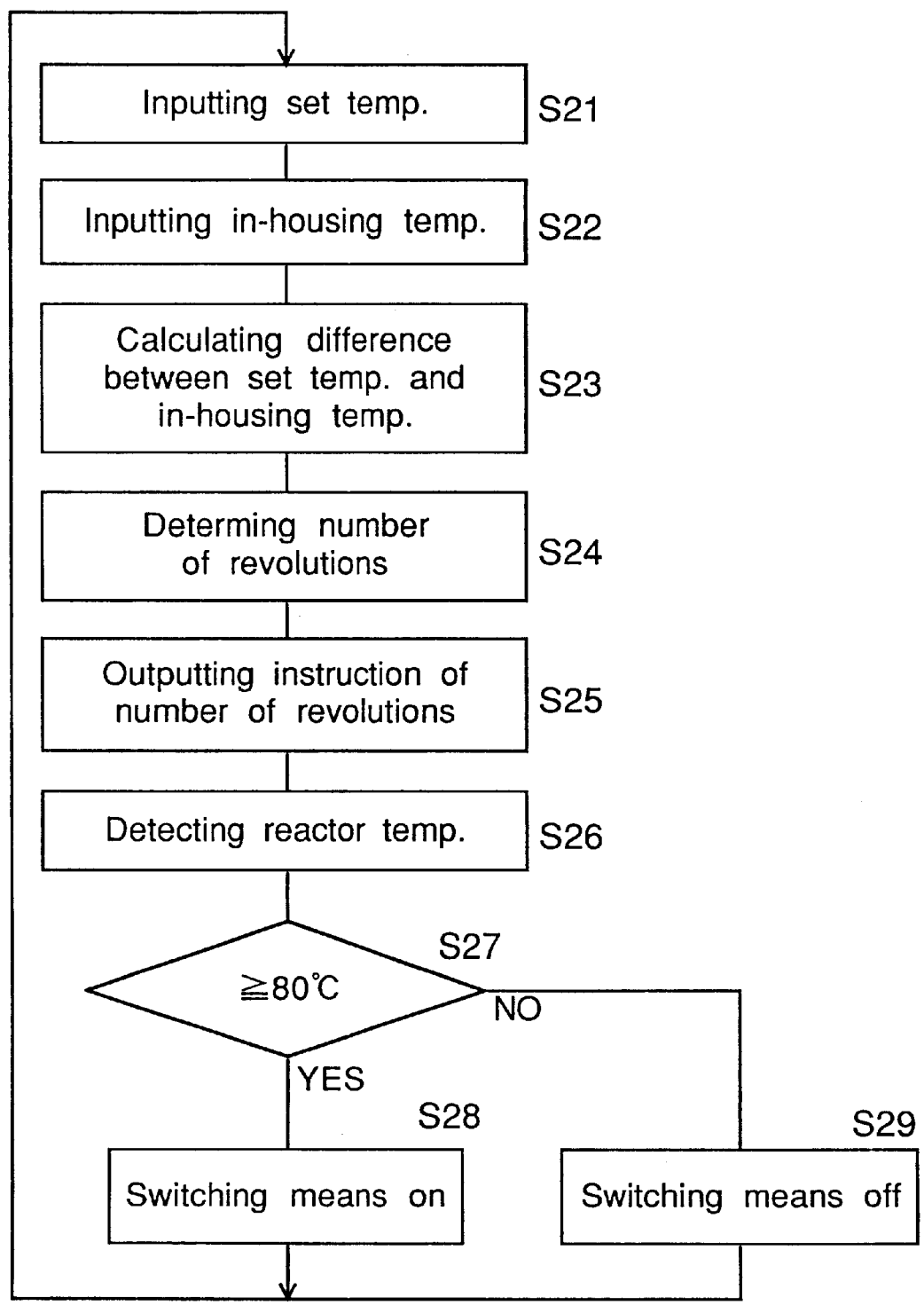
FIG. 18 is a flow chart of operations of the electric power unit and its peripheral parts of FIG. 17.
Figure 19:
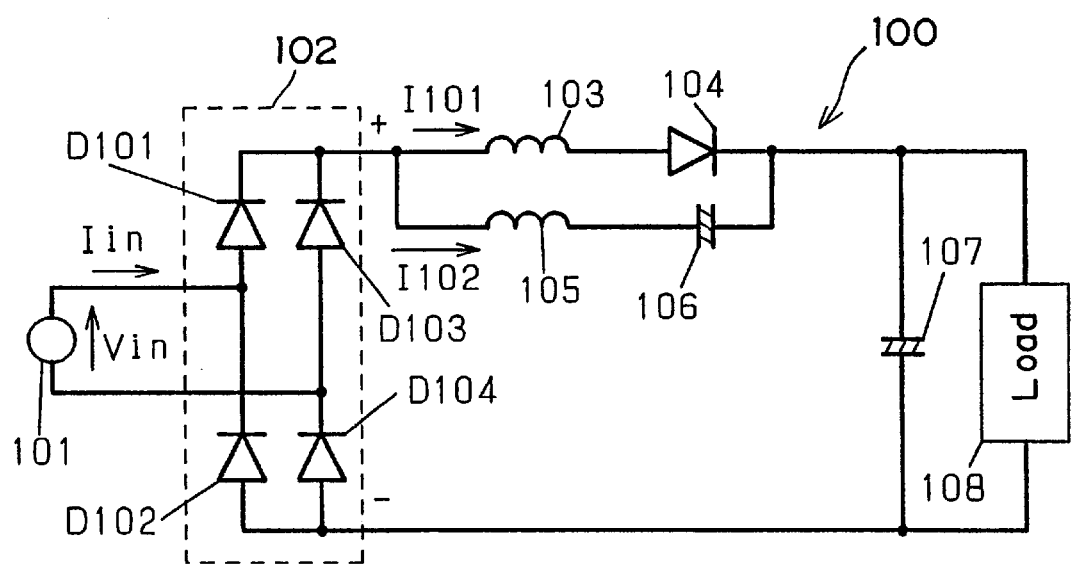
FIG. 19 is a circuit diagram of a conventional electric power unit.
Figure 20:
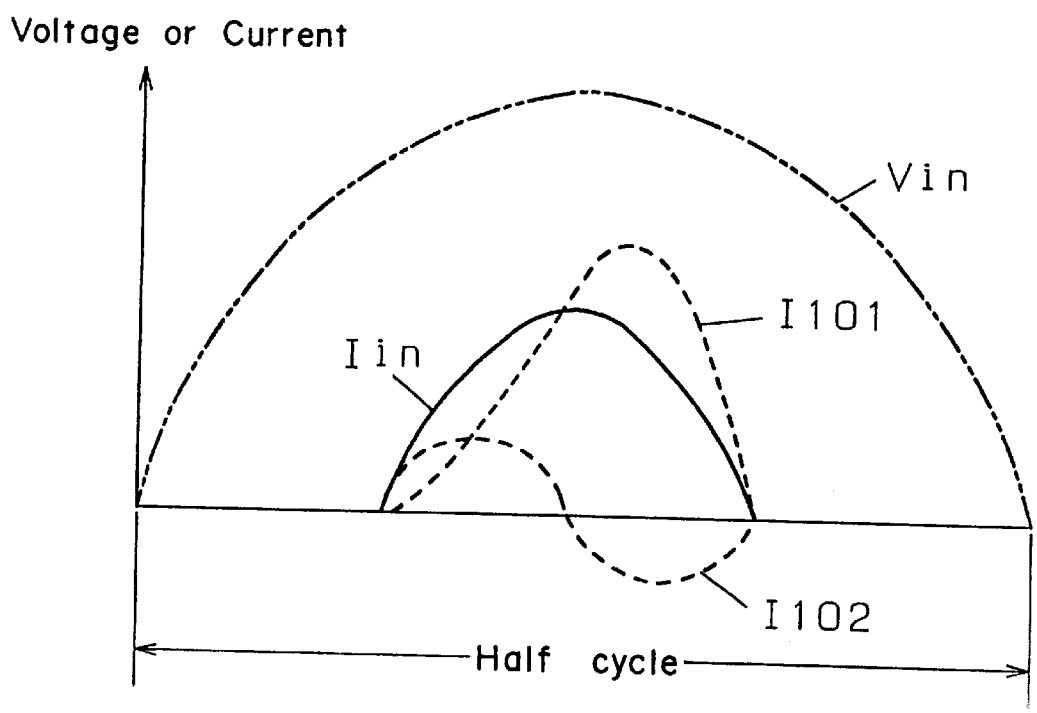
FIG. 20 is a diagram of waveforms of half a cycle at parts of the electric power unit of FIG. 19.

FIG. 18 is a flow chart of an example of operations of the electric power unit of FIG. 17 and its peripheral parts. The operation of the electric power unit of FIG. 17 and its peripheral parts will be described with reference to this flow chart.

In FIG. 18, in step S31, the control means 72 inputs a set temperature from the temperature setting means 49. In step S32, the control means 72 inputs a compartment temperature from the temperature detecting means 48. In step S33, the control means 72 calculates a temperature difference between the set temperature and compartment temperature. In step S34, the control means determines a revolution number for driving the compressor 46. In step S35, the control means sends the determined revolution number to the inverter 45 as a revolution number command. Then, the control means 72 inputs in step S36 a temperature of the first reactor 42 detected by the reactor temperature detecting means 71, judges in step S37 whether or not the temperature of the first reactor 42 is not lower than 80° C. If the temperature is not lower than 80° C. (yes), the control means turns ON the switching means 44 in step S38 and returns to step S31. The control means 72 turns OFF the switching means 44 if the first reactor 42 is lower than 80° C. in step S37 (no), and returns to step S31.

Similar to Embodiment 6, the inductance L of the reactor circuit 41 is decreased and the current capacity Imax is increased when the current I1 is large and higher harmonic components are reduced upon the application of a high load. On the other hand, the inductance L is increased and the current capacity Imax is decreased at the time of a low load as the current I1 is small and higher harmonic components are increased. Similar to Embodiment 6, again, the inductance L of the reactor circuit 41 can be reduced without any trouble when the current I1 is increased. Since a diagram of waveforms of half a cycle of the electric power unit 40 in FIG. 17 becomes the same as in FIG. 11, it is not shown here.

In the electric power unit according to Embodiment 9, the waveform of the input current Iin is widened as compared with that in the general case and the current peak value is decreased, whereby higher harmonics are restricted. When the first reactor 42 has a high temperature with the current I1 increased and higher harmonic components reduced, the inductance L of the reactor circuit 41 is decreased and the current capacity Imax is increased. Accordingly, a reactor of a large current capacity and a large inductance is not needed in the electric power unit of the Embodiment. Moreover, the direct current resistance in the reactor circuit 41 is decreased, so that the loss at the reactor circuit 41 when the first reactor 42 shows a high temperature and the current I1 is large is cut down. In comparison with a general electric power unit using the higher harmonics control method by means of a passive filter (a reactor alone), the electric power unit of Embodiment 9 accomplishes effective suppression of higher harmonics by the auxiliary capacitor 3, diode 5, capacity variable reactor circuit 41 and control means 72 switching the capacity of the reactor circuit 41 in accordance with the temperature of the first reactor 42. Because of the very small and inexpensive parts of the electric power unit, the electric power unit is made compact and low-cost with bringing about little loss.

In Embodiment 9, the control means 72 may be adapted to switch the capacity of the reactor circuit 41 in accordance with not only the temperature of the first reactor 42, but the set revolution number of the compressor 46 in the same manner as the control means 47 of Embodiment 6.

APPLICABILITY IN INDUSTRY

According to the present invention, the electric power unit using smaller parts achieves sufficient restriction to higher harmonics in the compact and low-cost constitution.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An electric power unit for use with a load and for use in feeding electric power to the load, said electric power unit comprising:

an alternating current power source;

a bridge-type rectification circuit having an input from said alternating current power source and including diodes in bridge connection;

a series circuit of a capacity-variable reactor and a diode connected to one output of said bridge-type rectification circuit and to be connected between said one output of said bridge-type rectification circuit and the load so as to flow a load current in a forward direction;

a smoothing capacitor to be connected in parallel to the load; and an auxiliary capacitor connected in parallel to an output of said bridge-type rectification circuit and having a capacity which is approximately 1/100 of a capacity of said smoothing capacitor.

2. An electric power unit according to claim 1, wherein said capacity-variable reactor includes a first reactor flowing the load current and a second reactor connected in parallel to said first reactor for bypassing the load current, said electric power unit further comprising a switching means for controlling the parallel connection of said second reactor to said first reactor and a switching control means for controlling switching of said switching means.

3. An electric power unit according to claim 2, wherein said switching control means is provided with an air temperature detector operable to detect an outside air temperature, thereby controlling said switching means to connect said second reactor in parallel to said first reactor when the outside air temperature detected by said air temperature detector is not smaller than a predetermined value.

4. An electric power unit according to claim 3, for use with an inverter and a motor as the load, wherein a revolution number of the motor is to be controlled by the inverter, and said switching control means is operable for controlling the revolution number of the motor through controlling of the inverter, thereby controlling said switching means to connect said second reactor in parallel to said first reactor when the revolution number of the motor becomes not smaller than a predetermined value.

5. An electric power unit according to claim 2, wherein said switching control means is provided with a load current detector operable to detect a load current, thereby controlling said switching means to connect said second reactor in parallel to said first reactor when the load current detected by said load current detector is not smaller than a predetermined value.

6. An electric power unit according to claim 5, for use with an inverter and a motor as the load, wherein a revolution number of the motor is to be controlled by the inverter, and said switching control means is operable for controlling the revolution number of the motor through controlling of the inverter, thereby controlling said switching means to connect said second reactor in parallel to said first reactor when the revolution number of the motor becomes not smaller than a predetermined value.

7. An electric power unit according to claim 2, wherein said switching control means is provided with a reactor temperature detector operable to detect a temperature of said first reactor, thereby controlling said switching means to connect said second reactor in parallel to said first reactor when the temperature of said first reactor detected by said reactor temperature detector is not smaller than a predetermined value.

8. An electric power unit according to claim 7, for use with an inverter and a motor as the load, wherein a revolution number of the motor is to be controlled by the inverter, and said switching control means is operable for controlling the revolution number of the motor through controlling of the inverter, thereby controlling said switching means to connect said second reactor in parallel to said first reactor when the revolution number of the motor becomes not smaller than a predetermined value.

9. An electric power unit according to claim 2, for use with an inverter and a motor as the load, wherein a revolution number of the motor is to be controlled by the inverter, and said switching control means is operable for controlling the revolution number of the motor through controlling of the inverter, thereby controlling said switching means to connect said second reactor in parallel to said first reactor when the revolution number of the motor becomes not smaller than a predetermined value.

10. An electric power unit according to claim 9, wherein the motor is a compressor of an electric refrigerator and, said switching control means is provided with a temperature detector operable to detect a temperature inside the electric refrigerator and a temperature setter operable to set a temperature inside the electric refrigerator, thereby controlling the revolution number of the compressor via the inverter in accordance with a difference of temperatures detected by said detector and set by said setter and controlling said switching means to connect said second reactor in parallel to said first reactor when the revolution number of the compressor becomes not smaller than the predetermined value.

11. An electric power unit for use with a load and for use in feeding electric power to the load, said electric power unit comprising:

an alternating current power source;

a bridge-type rectification circuit having an input from said alternating current power source and including diodes in bridge connection;

a smoothing capacitor to be connected in parallel to the load;

an auxiliary reactor having one end connected to one output of said bridge-type rectification circuit;

an auxiliary capacitor connected to the other end of said auxiliary reactor and the other output of said bridge-type rectification circuit and having a capacity which is approximately $1/100$ of a capacity of said smoothing capacitor;

a series circuit of a capacity-variable reactor and a diode connected to the other end of said auxiliary reactor and to be connected between said other end of said auxiliary reactor and the load so as to flow a load current in a forward direction.

12. An electric power unit according to claim 11, wherein said capacity-variable reactor includes a first reactor flowing the load current and a second reactor connected in parallel to said first reactor for bypassing the load current, said electric power unit further comprising a switching means for controlling the parallel connection of said second reactor to said first reactor and a switching control means for controlling switching of said switching means.

13. An electric power unit for use with a load and for use in feeding electric power to the load, said electric power unit comprising:

an alternating current power source;

a bridge-type rectification circuit having an input from said alternating current power source and including diodes in bridge connection;

a capacity-variable reactor with a middle tap, which has one end connected to one output of said bridge-type rectification circuit;

a smoothing capacitor to be connected in parallel to the load;

an auxiliary capacitor connected to the middle tap of said capacity-variable reactor and the other output of said bridge-type rectification circuit and having a capacity which is approximately $1/100$ of a capacity of said smoothing capacitor; and a diode connected to the other end of said capacity-variable reactor and to be connected between said other end of said capacity-variable reactor and the load so as to flow a load current in a forward direction.

14. An electric power unit according to claim 13, wherein said capacity-variable reactor includes a first reactor flowing the load current and a second reactor connected in parallel to said first reactor for bypassing the load current, said electric power unit further comprising a switching means for controlling the parallel connection of said second reactor to said first reactor and a switching control means for controlling switching of said switching means.

15. An electric power unit for use with a load and for use in feeding electric power to the load, said electric power unit comprising:

an alternating current power source;

a bridge-type rectification circuit having an input from said alternating current power source and including diodes in bridge connection;

a first diode connected to one output of said bridge-type rectification circuit and to be connected between said one output of said bridge-type rectification circuit and the load in a forward direction;

a capacity-variable reactor having one end connected to said one output of said bridge-type rectification circuit;

a second diode connected to the other end of said capacity-variable reactor and to be connected between said other end of said capacity-variable reactor and the load in the forward direction; and a smoothing capacitor connected to the other end of said capacitor-variable reactor and the other output of said bridge-type rectification circuit.

16. An electric power unit according to claim 15, wherein said capacity-variable reactor includes a first reactor flowing the load current and a second reactor connected in parallel to said first reactor for bypassing the load current, said electric power unit further comprising a switching means for controlling the parallel connection of said second reactor to said first reactor and a switching control means for controlling switching of said switching means.

17. An electric power unit for use with a load and for use in feeding electric power to the load, said electric power unit comprising:

an alternating current power source;

a bridge-type rectification circuit having an input from said alternating current power source and including diodes in bridge connection;

a capacity-variable reactor connected to one output of said bridge-type rectification circuit and to be connected between said one output of said bridge-type rectification circuit and the load;

a series circuit of a voltage drop means and a first diode which is so connected as to flow a load current in a forward direction, having one end connected to said capacity variable reactor at the side of the load;

a second diode connected to an output of said series circuit and to be connected between said output of said series circuit and the load in the forward direction; and a smoothing capacitor connected to the output of said series circuit and the other output of said bridge-type rectification circuit.

18. An electric power unit according to claim 17, wherein said capacity-variable reactor includes a first reactor flowing the load current and a second reactor connected in parallel to said first reactor for bypassing the load current, said electric power unit further comprising a switching means for controlling the parallel connection of said second reactor to said first reactor and a switching control means for controlling switching of said switching means.

* * * * *